US012801052B2

(12) United States Patent
Sasaki et al.

(10) Patent No.: US 12,801,052 B2
(45) Date of Patent: Nov. 17, 2026

(54) DEVELOPER SET AND IMAGE FORMING APPARATUS

(71) Applicant: KYOCERA Document Solutions Inc., Osaka (JP)

(72) Inventors: Asami Sasaki, Osaka (JP); Norio Kubo, Osaka (JP); Masashi Fujishima, Osaka (JP); Kohei Terasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 611 days.

(21) Appl. No.: 18/458,606

(22) Filed: Aug. 30, 2023

(65) Prior Publication Data

US 2024/0069458 A1 Feb. 29, 2024

(30) Foreign Application Priority Data

Aug. 31, 2022 (JP) ................................ 2022-138125

(51) Int. Cl.

| | |
|---|---|
| ***G03G 9/113*** | (2006.01) |
| ***G03G 9/08*** | (2006.01) |
| ***G03G 9/097*** | (2006.01) |
| ***G03G 15/08*** | (2006.01) |

(52) U.S. Cl.

CPC ......... *G03G 9/1139* (2013.01); *G03G 9/0819* (2013.01); *G03G 9/09725* (2013.01); *G03G 9/1136* (2013.01); *G03G 15/0894* (2013.01)

(58) Field of Classification Search

CPC ............... G03G 9/1139; G03G 9/0819; G03G 9/09725; G03G 9/1136; G03G 15/0894

See application file for complete search history.

(56) References Cited

U.S. PATENT DOCUMENTS

2015/0003875 A1* 1/2015 Ishigami .................. G03G 9/10 399/223
2020/0096888 A1* 3/2020 Anno .................. G03G 9/0839
2020/0257215 A1* 8/2020 Kobayashi ......... G03G 9/09716

FOREIGN PATENT DOCUMENTS

JP 2005-91878 A 4/2005
JP 2007033631 A * 2/2007

OTHER PUBLICATIONS

English machine translation of the description of JP-2007033631-A (Year: 2007).*

* cited by examiner

*Primary Examiner* — Boone Alexander Evans
(74) *Attorney, Agent, or Firm* — Studebaker Brackett PLLC

(57) ABSTRACT

A developer set includes a first developer and a second developer. The first developer contains a first toner containing first toner particles and a first carrier containing first carrier particles. The second developer contains a second toner containing second toner particles and a second carrier containing second carrier particles. The first toner particles and the second toner particles each include a toner mother particle and external additive particles attached to the surface of the toner mother particle. The external additive particles include spacer particles. The spacer particles have a number average primary particle diameter of at least 32 nm and no greater than 145 nm. The first carrier particles each include a first carrier mother particle and strontium titanate particles attached to the surface of the first carrier mother particle.

10 Claims, 4 Drawing Sheets

DEVELOPER SET AND IMAGE FORMING APPARATUS

INCORPORATION BY REFERENCE

The present application claims priority under 35 U.S.C. § 119 to Japanese Patent Application No. 2022-138125, filed on Aug. 31, 2022. The contents of this application are incorporated herein by reference in their entirety.

BACKGROUND

The present disclosure relates to a developer set and an image forming apparatus.

Image forming apparatuses that form images with a toner are required to form images with desired image density even in a low-temperature and low-humidity environment (e.g., an environment at a temperature of 10° C. and a relative humidity of 15%) where image density of formed images tends to decrease. The image forming apparatuses are also required to form images with less fogging even in a high-temperature and high-humidity environment (e.g., an environment at a temperature of 32.5° C. and a relative humidity of 80%) where fogging of formed images is likely to occur. An electrophotographic developer containing for example a toner and a carrier is proposed for the purpose of inhibiting toner attachment to a non-image area of paper. The carrier is formed with carrier cores coated with resin layers. In a process prior to mixing with the toner, at least one additive for use in the toner is pre-added to and mixed with the carrier.

SUMMARY

A developer set according to an aspect of the present disclosure includes a first developer and a second developer. The first developer contains a first toner containing first toner particles and a first carrier containing first carrier particles. The second developer contains a second toner containing second toner particles and a second carrier containing second carrier particles. The first toner particles and the second toner particles each include a toner mother particle and external additive particles attached to a surface of the toner mother particle. The external additive particles include spacer particles. The spacer particles have a number average primary particle diameter of at least 32 nm and no greater than 145 nm. The first carrier particles each include a first carrier mother particle and strontium titanate particles attached to a surface of the first carrier mother particle. The number average primary particle diameter of the spacer particles is larger than that of the strontium titanate particles. The second carrier particles each include a second carrier mother particle. The second carrier particles substantially include no strontium titanate particles on surfaces of the second carrier mother particles. The first carrier mother particles and the second carrier mother particles each include a carrier core and a coat layer covering a surface of the carrier core. The coat layers contain a coating resin and barium titanate particles. The coating resin includes silicone resin. The barium titanate particles have a number average primary particle diameter of at least 100 nm and no greater than 500 nm.

An image forming apparatus according to another aspect of the present disclosure includes the aforementioned developer set and a development device that develops an electrostatic latent image with the developer set. The first developer is an initial developer. The second developer is a replenishment developer. The development device includes an accommodation section that accommodates the initial developer and a replenishment section that replenishes the accommodation section with the replenishment developer.

DETAILED DESCRIPTION

Figure 1:
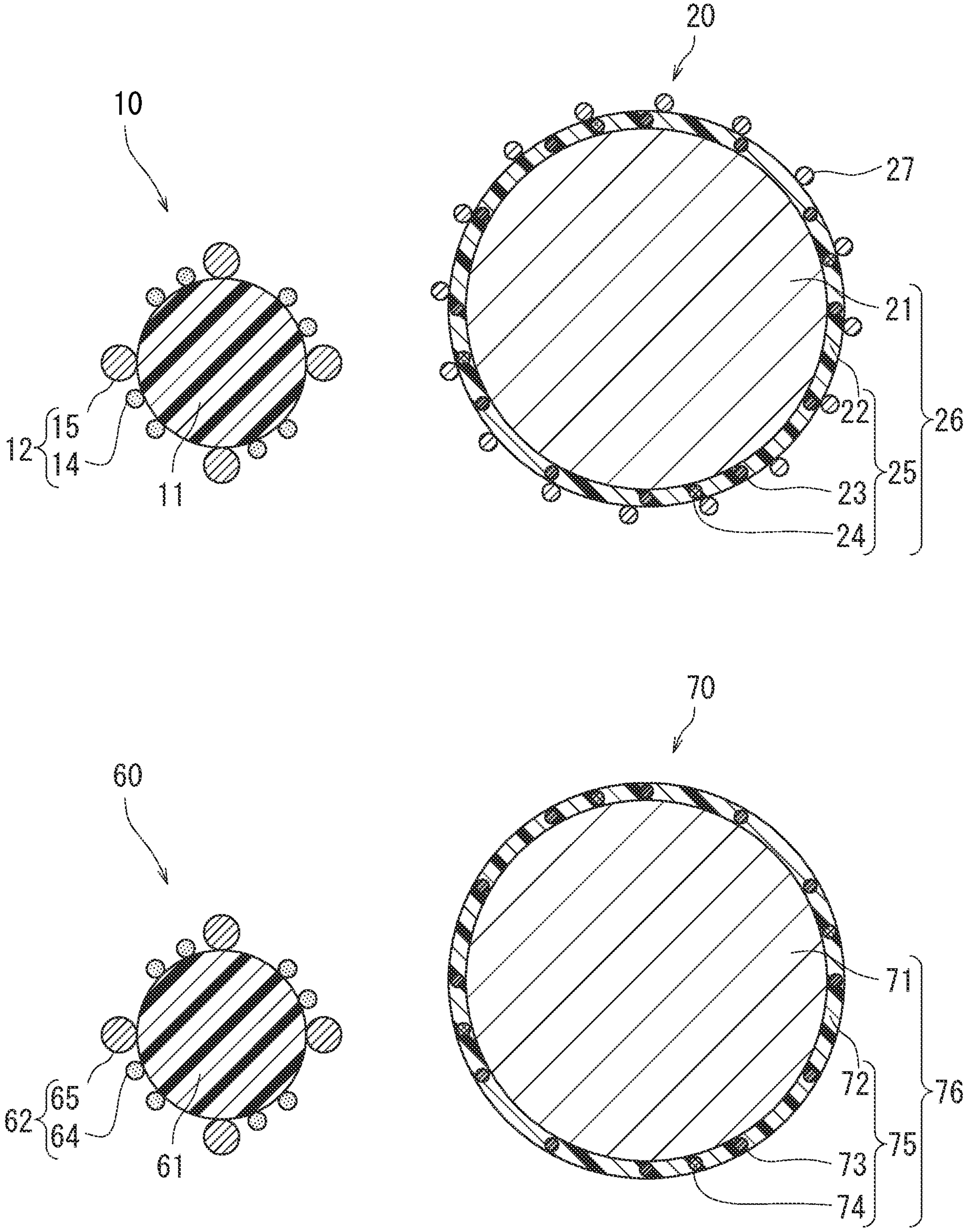
FIG. 1 is a cross-sectional view of examples of a first toner particle, a first carrier particle, a second toner particle, and a second carrier particle in a developer set according to a first embodiment of the present disclosure.

The meaning of the terms and measurement methods that are used in the present specification are described first. A toner is a collection (e.g., a powder) of toner particles. An external additive is a collection (e.g., a powder) of external additive particles. A carrier is a collection (e.g., a powder) of carrier particles. Values indicating for example shape or property of a powder (specific examples include a powder of toner particles, a powder of external additive particles, or a powder of carrier particles) each are a number average value of values as measured with respect to a suitable number of particles selected from the powder unless otherwise stated. The "main component" of a material means a component most abundant in the material in terms of mass unless otherwise stated. In the following description, the term "-based" may be appended to the name of a chemical compound to form a generic name encompassing both the chemical compound itself and derivatives thereof. When the term "-based" is appended to the name of a chemical compound to represent the name of a polymer, the term indicates that a repeating unit of the polymer originates from the chemical compound or a derivative thereof. The term "(meth)acryl" is used as a generic term for both acryl and methacryl. One type of each component described in the present specification may be used independently, or two or more types of the component may be used in combination.

Values for saturation magnetization are values as measured using a high sensitivity vibrating sample magnetometer (e.g., "VSM-P7", product of TOEI INDUSTRY CO., LTD.) under a condition of an external magnetic field of 3000 (unit: Oe) unless otherwise stated. The volume median diameter ($D_{50}$) of a powder is a median diameter of the powder as measured using a laser diffraction/scattering type particle size distribution analyzer (e.g., "LA-950", product of HORIBA, Ltd.) unless otherwise stated. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average value of equivalent circle diameters of 100 primary particles, for example. Values for softening point (Tm) are values as measured using a capillary rheometer (e.g., "CFT-500D", product of Shimadzu Corporation) unless otherwise stated. On an S-shaped curve (vertical axis: temperature, horizontal axis: stroke) as plotted using the capillary rheometer, the softening point (Tm) corresponds to the temperature corresponding to a stroke value of "(base line stroke value+maximum stroke value)/2". Values for melting point (Mp) each are a temperature at a maximum endothermic peak on an endothermic curve (vertical axis: heat flow (DSC signal), horizontal axis: temperature) as plotted using a differential scanning calorimeter (e.g., "DSC-6220", product of Seiko Instruments Inc.) unless otherwise state. The endothermic peak appears due to melting of the crystallization site. Values for glass transition point (Tg) are values as measured in accordance with "the Japanese Industrial Standards (JIS) K7121-2012" using a differential scanning calorimeter (e.g., "DSC-6220", product of Seiko Instruments Inc.) unless otherwise stated. The glass transition point corresponds to the temperature corresponding to a point of inflection (specifically, an intersection point of an extrapolated baseline and an extrapolated falling line) caused by glass transition on a heat absorption curve (vertical axis: heat flow (DSC signal), horizontal axis: temperature) plotted using the differential scanning calorimeter. Values for acid value and hydroxyl value are values as measured in accordance with "the Japanese Industrial Standards (JIS) K0070-1992" unless otherwise stated. Values for mass average molecular weight (Mw) are values as measured using gel permeation chromatography unless otherwise state. Values for amount of charge (unit: μC/g) are values as measured using a compact suction-type charge measuring device (e.g., MODEL 252HS", product of TREK, INC.) in an environment at a temperature of 25° C. and a relative humidity of 50% unless otherwise stated. The meaning of the terms and the measurement methods that are used in the present specification have been explained so far.

First Embodiment: Developer Set

The following describes a developer set according to a first embodiment of the present disclosure. In the following, the "developer set according to the first embodiment" may be also referred to below as a "developer set of the present disclosure". The developer set of the present disclosure is a developer set including two-component developers.

The developer set of the present disclosure includes a first developer and a second developer. The first developer contains a first toner containing first toner particles and a first carrier containing first carrier particles. The second developer contains a second toner containing second toner particles and a second carrier containing second carrier particles. The first toner particles and the second toner particles each include a toner mother particle and external additive particles attached to the surface of the toner mother particle. The external additive particles include spacer particles. The spacer particles have a number average primary particle diameter of at least 32 nm and no greater than 145 nm. The first carrier particles each include a first carrier mother particle and strontium titanate particles attached to the surface of the first carrier mother particle. The number average primary particle diameter of the spacer particles is larger than that of the strontium titanate particles. The second carrier particles each include a second carrier mother particle. The second carrier particles each substantially include no strontium titanate particles on the surfaces of the second carrier mother particles. The first carrier mother particles and the second carrier mother particles each include a carrier core and a coat layer covering the surface of the carrier core. The coat layers contain a coating resin and barium titanate particles. The coating resin includes silicone resin. The barium titanate particles have a number average primary particle diameter of at least 100 nm and no greater than 500 nm.

The developer set of the present disclosure is suitable for an image forming apparatus of so-called trickle development type described later in a second embodiment. Upon starting developing an electrostatic latent image with an initial developer in a development device, the image forming apparatus of trickle development type develops the electrostatic latent image with the developer in the development device while performing discharge of the developer in the development device and replenishment of the development device with the replenishment developer. During image formation, the development device is replenished with the carrier together with the toner and the carrier in an excess replenishment amount in the development device is discharged. This can inhibit degradation of the carrier in the development device. Furthermore, as a result of degradation of the carrier being inhibited, the number of times of replacement of the carrier in the development device can be reduced.

The first developer of the developer set of the present disclosure is suitable as an initial developer. The second developer is suitable as a replenishment developer.

As a result of having the above features (also referred to below as Features X), the developer set of the present disclosure can form images with desired image density even in a low-temperature and low-humidity environment and form images with less fogging even in a high-temperature and high-humidity environment. The reasons therefor may be inferred as below.

The coat layers of the first carrier mother particles of the first carrier particles and the coat layers of the second carrier mother particles of the second carrier particles contain barium titanate particles in the developer set of the present disclosure. As a result of the coat layers containing the barium titanate particles, which are ferroelectric, the first carrier particles and the second carrier particles can have large electrostatic capacities. The first carrier particles and the second carrier particles with large electrostatic capacities can be frictionally charged to desired amount of charge (amount of charge with a polarity opposite to that of the first toner particles and the second toner particles). Accordingly, the first carrier particles and the second carrier particles have high charging ability with a result that charge of which amount is commensurate with the charge acceptance of the first toner particles and the second toner particles can be stably supplied to the first toner particles and the second toner particles respectively from the first carrier particles and the second carrier particles. Therefore, the developer set of the present disclosure can reduce variation in amount of charge of the first toner and the second toner and increase charge stability of the first toner and the second toner.

The specific permittivity of the barium titanate particles decreases as the size of the barium titanate particles is reduced excessively. By contrast, the barium titanate particles tend to easily dissociate from the coat layers as the size thereof is increased excessively. As such, the barium titanate particles in the developer set of the present disclosure are set to have a number average primary particle diameter of at least 100 nm and no greater than 500 nm. Note that strength of the coat layers can be increased through the coat layers containing the barium titanate particles with high hardness. As a result, abrasion of the coat layers of the first carrier particles and the coat layers of the second carrier particles can be inhibited to increase the life of the first carrier particles and the second carrier particles.

Furthermore, known developer sets can cause a phenomenon in which toner particles become excessively charged directly after start of use. Once the phenomenon occurs, image density may decrease. The phenomenon is likely to occur in a low-temperature and low-humidity environment. In view of the foregoing, the first carrier particles of the first developer include the strontium titanate particles on the surfaces of the first carrier mother particles. The strontium titanate particles play a role of moderately adjusting the amounts of charge of the first toner particles and the second toner particles by extracting excess charge from the first toner particles of the first developer and the second toner particles of the supplied second developer. As such, as a result of the first carrier particles including the strontium titanate particles, excessive charge to the first toner particles and the second toner particles can be inhibited. From the above, the developer set of the present disclosure can further increase charge stability to the first toner and the second toner and can form images with desired image density even in a low-temperature and low-humidity environment.

However, the strontium titanate particles function as a highly hygroscopic component. As such, use of a known developer set may cause a phenomenon in which charge is excessively extracted from toner particles when the strontium titanate particles are added to carrier particles. Once the phenomenon occurs, fogging may occur in image formation in a high-temperature and high-humidity environment. In view of the foregoing, only the first carrier particles include the strontium titanate particles while the second carrier particles substantially include no strontium titanate particles in the developer set of the present disclosure. Accordingly, when consecutive printing is performed for a long time with the developer set of the present disclosure, the first carrier particles in a development device are gradually replaced by the second carrier particles and almost all the carrier particles in the development device are finally the second carrier particles. The second carrier particles, which substantially include no strontium titanate particles, do not excessively extract charge from the first toner particles and the second toner particles. As a result, charge stability of the first toner and the second toner can be further increased in the developer set of the present disclosure, thereby achieving formation of images with less fogging even in a high-temperature and high-humidity environment.

Here, the strontium titanate particles have a high degree of hardness and a high specific gravity and are therefore easily buried in the coat layers. Burial of the strontium titanate particles in the coat layers reduces the effect of increasing charge stability of the first toner and the second toner. In view of the foregoing, the first toner particles and the second toner particles each include the toner mother particle having surfaces with the spacer particles thereon in the developer set of the present disclosure. The spacer particles decrease the contact area between the first carrier particles and the first toner particles or the second toner particles to inhibit burial of the strontium titanate particles in the coat layers. Note that the spacer particles also play a role of inhibiting excessive charge of the first toner particles that is caused due to the first toner particles and the first carrier particles being in close contact with each other directly after start of use of the developer set of the present disclosure. Furthermore, the spacer particles can inhibit burial of additional toner external additive particles (e.g., silica particles) of the first toner particles and the second toner particles in the toner mother particles.

In order for the spacer particles to play their role, the spacer particles should be large to some extent. However, when the spacer particles are excessively large or when the amount of the spacer particles are excessive, the spacer particles inhibit contact between the strontium titanate particles and the first toner particles or the second toner particles. This makes it difficult for the strontium titanate particles to extract charge from the first toner particles and the second toner particles. In view of the foregoing, the spacer particles have a number average primary particle diameter of least 32 nm and no greater than 145 nm, are larger in diameter than the strontium titanate particles in the developer set of the present disclosure. As such, as a result of the spacer particles being appropriate in size in the developer set of the present disclosure, the strontium titanate particles can be inhibited from being buried in the coat layers over a long period of time. Thus, charge stability of the first toner and the second toner can be further increased in the developer set of the present disclosure.

The reasons have been described so far why the developer set of the present disclosure can form images with desired image density even in a low-temperature and low-humidity environment and form images with less fogging even in a high-temperature and high-humidity environment. Note that the spacer particles are preferably have chargeability with the same polarity as that of the first toner particles and the second toner particles in terms of increasing chargeability of the first toner particles and the second toner particles. However, spacer particles highly charged to the same polarity as that of toner mother particles in known developers may dissociate from the toner mother particles by electrostatic repulsion and easily attach to carrier mother particles. In view of the foregoing, the strontium titanate particles plays a role of extracting excessive charge also from the spacer particles in the developer set of the present disclosure. As a result, the spacer particles are inhibited from dissociating from the toner mother particles to reliably exhibit their function in the developer of the present disclosure.

The following describes examples of the structures of the first toner particles and the first carrier particles of the first developer and the second toner particles and the second carrier particles of the second developer with reference to FIG. 1. FIG. 1 is a cross-sectional view of examples of a first toner particle 10, a first carrier particle 20, a second toner particle 60 and a second carrier particle 70 of the developer set of the present disclosure.

The first toner particle 10 illustrated in FIG. 1 includes a toner mother particle 11 and external additive particles 12. The toner mother particle 11 is a non-capsule toner mother particle. The external additive particles 12 are attached to (provided on) the surface of the toner mother particle 11. The external additive particles 12 include silica particles 14 and spacer particles 15. The external additive particles 12 may further include particles (also referred to below as additional toner external additive particles) other than the silica particles 14 and the spacer particles 15.

The first carrier particle 20 illustrated in FIG. 1 includes a first carrier mother particle 26 and strontium titanate particles 27. The strontium titanate particles 27 are attached to (provided on) the surface of the first carrier mother particle 26. The first carrier mother particle 26 includes a carrier core 21 and a coat layer 25. The coat layer 25 covers the surface of the carrier core 21. For example, the coat layer 25 covers the entire surface of the carrier core 21. The coat layer 25 contains barium titanate particles 23 and a coating resin constituting a coating resin area 22. The coat layer 25 may further contain carbon black particles 24 as necessary.

The second toner particle 60 illustrated in FIG. 1 includes a toner mother particle 61 and external additive particles 62. The toner mother particle 61 is a non-capsule toner mother particle. The external additive particles 62 are attached to (provided on) the surface of the toner mother particle 61. The external additive particles 62 include silica particles 64 and spacer particles 65. The external additive particles 62 may further include additional toner external additive particles. The second toner particle 60 is basically identical to the first toner particle 10.

The second carrier particle 70 illustrated in FIG. 1 includes a second carrier mother particle 76. The second carrier mother particle 76 includes a carrier core 71 and a coat layer 75. The coat layer 75 covers the surface of the carrier core 71. For example, the coat layer 75 covers the entire surface of the carrier core 71. The coat layer 75 contains barium titanate particles 73 and a coating resin constituting a coating resin area 72. The coat layer 75 may further contain carbon black particles 74 as necessary. The second carrier mother particle 76 of the second carrier particle 70 is basically identical to the first carrier mother particle 26 of the first carrier particle 20. However, the second carrier particle 70 differs from the first carrier particle 20 in that it substantially includes no strontium titanate particles. The spacer particles 15 of the first toner particle 10 are larger than the strontium titanate particles 27. The spacer particles 65 of the second toner particle 60 is larger than the strontium titanate particles 27.

Examples of the structures of the first toner particles, the first carrier particles, the second toner particles, and the second carrier particles of the developer set of the present disclosure have been described so far with reference to FIG. 1. However, the first toner particles, the first carrier particles, the second toner particles, and the second carrier particles of the developer set of the present disclosure are not limited particularly, and may differ in structures from the first toner particles 10, the first carrier particle 20, the second toner particle 60, and the second carrier particle 70, respectively. For example, the external additive particles may not include silica particles. In addition, the external additive particles may include aluminum oxide particles as the additional toner external additive particles. The toner mother particles may be capsule toner mother particles each including a toner core and a shell layer covering the toner core. Furthermore, it is only required that the coat layers of the first carrier particles and the second carrier particles each cover at least a part of the carrier core. That is, a part of each carrier core may be exposed. The coat layers of the first carrier particles and the second carrier particles may not contain carbon black particles. Furthermore, the first toner particles and the second toner particles may be different in size or components. Likewise, the first carrier mother particles of the first carrier particles and the second carrier mother particles of the second carrier particles may be different in size or components. The first toner, the first carrier, the second toner, and the second carrier are described next further in detail.

<First Toner>

The first toner includes first toner particles. As described previously, the first toner particles each include a toner mother particle and external additive particles.

<<External Additive Particles of First Toner Particles>>

The external additive particles of the first toner particles include spacer particles and additional toner external additive particles as necessary. The external additive particles preferably include silica particles (specifically, silica particles not corresponding to the spacer particles) as the additional toner external additive particles.

(Silica Particles)

The silica particles (i.e., silica particles with a number average primary particle diameter of less than 32 nm or greater than 145 nm) not corresponding to the spacer particles are described here. The silica particles are an optional component for optimizing fluidity and chargeability of the first toner particles. The silica articles have a number average primary particle diameter of preferably at least 10 nm and no greater than 30 nm, and more preferably at least 15 nm and no greater than 25 nm. The silica particles may be surface treated. For example, either or both hydrophobicity and positive chargeability may be imparted to the surfaces of the silica particles with a surface treatment agent.

The amount of the silica particles in the first toner particles is preferably at least 0.1 parts by mass and no greater than 10.0 parts by mass relative to 100.0 parts by mass of the toner mother particles, and more preferably at least 0.4 parts by mass and no greater than 3.0 parts by mass.

(Spacer Particles)

The spacer particles have a number average primary particle diameter of at least 32 nm and no greater than 145 nm as described previously, preferably at least 32 nm and no greater than 125 nm, more preferably at least 45 nm and no greater than 100 nm, and further preferably at least 55 nm and no greater than 70 nm. The number average primary particle diameter of the spacer particles is larger than that of the strontium titanate particles. The difference between the number average primary particle diameter of the spacer particles and the number average primary particle diameter of the strontium titanate particles is preferably at least 5 nm, and more preferably at least 20 nm.

The amount of the spacer particles in the first toner particles is preferably at least 0.01 parts by mass and no greater than 4.0 parts by mass relative to 100.0 parts by mass of the toner mother particles, more preferably at least 0.09 parts by mass and no greater than 3.2 parts by mass, and further preferably at least 0.3 parts by mass and no greater than 1.2 parts by mass.

The spacer particles are not limited particularly, and particles with a number average primary particle diameter in the aforementioned range can be used among particles typically used as external additive particles of known toners. Examples of the spacer particles include silica particles (in the following, silica particles used as the spacer particles may be also referred to below as "large-diameter silica particles"), resin particles, aluminum oxide particles, magnesium oxide particles, zinc oxide particles, and composite particles obtained by combining any of them. Examples of the composite particles include composite particles including resin particles and silica particles attached to the surfaces of the resin particles (silica particles included in the composite particles may be also referred to below as "small-diameter silica particles").

The spacer particles are preferably the large-diameter silica particles, the resin particles, or the composite particles. However, when the spacer particles include the large-diameter silica particles, images with slightly low fixability tend to be formed although no practical problems are involved. This is because the first toner particles covered with the large-diameter silica particles are slightly less meltable in fixing to recording mediums. Therefore, the spacer particles are preferably the resin particles or the composite particles.

The resin particles included in the spacer particles have a number average primary particle diameter of preferably at least 32 nm and no greater than 125 nm, and more preferably at least 45 nm and no greater than 90 nm. The resin particles may be crosslinked resin particles or non-crosslinked resin particles. Examples of the crosslinked resin particles include particles containing a polymer of a raw material monomer including a cross-linkable monomer.

In order to favorably fix the first toner particles to recording mediums, the resin particles are preferably thermoplastic resin particles, and more preferably styrene-acrylic resin particles. Styrene-acrylic resin is a copolymer of at least one styrene-based monomer, at least one acrylic acid-based monomer, and an additional monomer used as needed. The additional monomer is preferably a cross-linkable monomer (e.g., divinylbenzene). The styrene-acrylic resin is preferably a copolymer of styrene and (meth)acrylic acid alkyl ester or a copolymer of styrene, (meth)acrylic acid alkyl ester, and divinylbenzene, and more preferably a copolymer of styrene and butyl (meth)acrylate or a copolymer of styrene, butyl (meth)acrylate, and divinylbenzene.

The percentage content of a repeating unit derived from styrene in all repeating units included in the styrene-acrylic resin is preferably at least 1% by mol and no greater than 30% by mol, and more preferably at least 5% by mol and no greater than 25% by mol. The percentage content of a repeating unit derived from the (meth)acrylic acid alkyl ester in all the repeating units included in the styrene-acrylic resin is preferably at least 10% by mol and no greater than 90% by mol, and more preferably at least 30% by mol and no greater than 85% by mol. The percentage content of a repeating unit derived from a cross-linkable monomer in all the repeating units included in the styrene-acrylic resin is preferably at least 20% by mol and no greater than 70% by mol, and more preferably at least 40% by mol and no greater than 60% by mol.

When the spacer particles include the large-diameter silica particles, the large-diameter silica particles have a number average primary particle diameter of preferably at least 32 nm and no greater than 145 nm, and more preferably at least 50 nm and no greater than 90 nm.

When the spacer particles include the composite particles, the composite particles have a number average primary particle diameter of preferably at least 40 nm and no greater than 130 nm, and more preferably at least 70 nm and no greater than 100 nm. The resin particles included in the composite particles are preferably the aforementioned styrene-acrylic resin particles. The resin particles included in the composite particles have a number average primary particle diameter of preferably at least 32 nm and no greater than 110 nm, and more preferably at least 50 nm and no greater than 90 nm. The small-diameter silica particles of the composite particles have a number average primary particle diameter of preferably at least 10 nm and no greater than 30 nm, and more preferably at least 15 nm and no greater than 25 nm. Note that the aforementioned composite particles can be obtained by applying an adhesive component such as silicone oil to the surfaces of the resin particles and then stirring the small-diameter silica particles and the resin particles with the adhesive component applied thereto.

(Additional Toner External Additive Particles)

Examples of the additional toner external additive particles include resin particles, aluminum oxide particles, magnesium oxide particles, and zinc oxide particles (except those corresponding to the spacer particles). The additional toner external additive particles are preferably aluminum oxide particles. The aluminum oxide particles are suitable as an abrasive for abrading the surfaces of photosensitive members. The aluminum oxide particles have a number average primary particle diameter of preferably at least 200 nm and no greater than 600 nm, and more preferably at least 300 nm and no greater than 500 nm.

The amount of the additional toner external additive particles is preferably at least 0.05 parts by mass and no greater than 3.0 parts by mass relative to 100.0 parts by mass of the toner mother particles, and more preferably at least 0.3 parts by mass and no greater than 1.5 parts by mass.

<<Toner Mother Particles>>

The toner mother particles contain a binder resin, for example. The toner mother particles may further contain at least one selected from the group consisting of a colorant, a charge control agent, and a releasing agent. The binder resin, the colorant, the charge control agent, and the releasing agent are described below.

(Binder Resin)

In order that the first toner has excellent low-temperature fixability, the toner mother particles preferably contain a thermoplastic resin as the binder resin, and more preferably contain a thermoplastic resin at a percentage content of at least 85% by mass to the total of the binder resin. Examples of the thermoplastic resin include polyester resin, styrene-based resin, acrylic acid-based resin, acrylic acid ester-based resins (specific examples include acrylic acid ester polymers and methacrylic acid ester polymers), olefin-based resins (specific examples include polyethylene resin and polypropylene resin), vinyl resins (specific examples include vinyl chloride resin, polyvinyl alcohol, vinyl ether resin, and N-vinyl resin), polyamide resin, and urethane resin. Any copolymer of these resins, that is, a copolymer (specific examples include styrene-acrylic resin and styrene butadiene resin) in which any repeating unit has been introduced into any of the above resins can be used as the binder resin.

The binder resin is preferably polyester resin. The polyester resin is a polymer of one or more polyhydric alcohol monomers and one or more polybasic carboxylic acid monomers. Note that a polybasic carboxylic acid derivative (specific examples include an anhydride of polybasic carboxylic acid and a halide of polybasic carboxylic acid) may be used instead of the polybasic carboxylic acid monomer.

Examples of the polyhydric alcohol monomers include diol monomers, bisphenol monomers, and tri- or higher-hydric alcohol monomers.

Examples of the diol monomers include ethylene glycol, diethylene glycol, triethylene glycol, 1,2-propanediol, 1,3-propanediol, 1,4-butanediol, neopentyl glycol, 2-butene-1,4-diol, 1,5-pentanediol, 1,6-hexanediol, 1,4-cyclohexanedimethanol, 1,4-benzenediol, dipropylene glycol, polyethylene glycol, polypropylene glycol, and polytetramethylene glycol.

Examples of the bisphenol monomers include bisphenol A, hydrogenated bisphenol A, bisphenol A ethylene oxide adduct, and bisphenol A propylene oxide adduct.

Examples of the tri- or more-hydric alcohol monomers include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the polybasic carboxylic acid monomers include dibasic carboxylic acid monomers and tri- or higher-basic carboxylic acid monomers.

Examples of the dibasic carboxylic acid monomers include maleic acid, fumaric acid, citraconic acid, itaconic acid, glutaconic acid, phthalic acid, isophthalic acid, terephthalic acid, 5-sulfoisophthalic acid, sodium 5-sulfoisophthalate, cyclohexanedicarboxylic acid, adipic acid, sebacic acid, azelaic acid, malonic acid, succinic acid, alkyl succinic acids, and alkenyl succinic acids. Examples of the alkyl succinic acids include n-butylsuccinic acid, isobutylsuccinic acid, n-octylsuccinic acid, n-dodecylsuccinic acid, and isododecyl succinic acid. Examples of the alkenyl succinic acids include n-butenylsuccinic acid, isobutenylsuccinic acid, n-octenylsuccinic acid, n-dodecenylsuccinic acid, and isododecenylsuccinic acid.

Examples of the tri- or higher-basic carboxylic acid monomers include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and Empor trimer acid.

The polyester resin is preferably a polymer of a bisphenol monomer, a dibasic carboxylic acid monomer, and a tribasic carboxylic acid monomer. More preferably, the polyester resin is a polymer of bisphenol A alkylene oxide adduct, dicarboxylic acid with a carbon number of at least 3 and no greater than 6, and aryl tricarboxylic acid. Further preferably, the polyester resin is a polymer of bisphenol A ethylene oxide adduct, bisphenol A propylene oxide adduct, fumaric acid, and trimellitic acid.

The polyester resin is preferably non-crystalline polyester resin. It is often not possible to determine a definite melting point for non-crystalline polyester resin. Therefore, polyester resin of which endothermic peak cannot be definitely identified on an endothermic curve plotted using a differential scanning calorimeter can be determined to be non-crystalline polyester resin.

The polyester resin has a softening point of preferably at least 50° C. and no greater than 200° C., and more preferably at least 80° C. and no greater than 120° C. The polyester resin has a glass transition point of preferably at least 40° C. and no greater than 100° C., and more preferably at least 40° C. and no greater than 60° C.

The polyester resin has a mass average molecular weight of preferably at least 10,000 and no greater than 50,000, and more preferably at least 20,000 and no greater than 40,000.

The polyester resin has a hydroxyl value of preferably at least 1 mgKOH/g and no greater than 30 mgKOH/g, and more preferably at least 10 mgKOH/g and no greater than 20 mgKOH/g. The polyester resin has a hydroxyl value of preferably at least 1 mgKOH/g and no greater than 50 mgKOH/g, and more preferably at least 20 mgKOH/g and no greater than 40 mgKOH/g.

(Colorant)

Any known pigment or dye can be used as the colorant according to the color of the first toner. Examples of the colorant include a black colorant, a yellow colorant, a magenta colorant, and a cyan colorant.

Examples of the black colorant include carbon black. Alternatively, the black colorant may be a colorant of which color is adjusted to a black color using a yellow colorant, a magenta colorant, and a cyan colorant.

One or more compounds selected from the group consisting of a condensed azo compound, an isoindolinone compound, an anthraquinone compound, an azo metal complex, a methine compound, and an aryl amide compound may be used as the yellow colorant. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

One or more compounds selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound may be used as the magenta colorant. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

One or more compounds selected from the group consisting of a copper phthalocyanine compound, an anthraquinone compound, and a basic dye lake compound may be used as the cyan colorant. Examples of the cyan colorant include C.I. Pigment Blue (1, 7, 15, 15:1, 15:2, 15:3, 15:4, 60, 62, or 66), Phthalocyanine Blue, C.I. Vat Blue, and C.I. Acid Blue.

The amount of the colorant is preferably at least 1 part by mass and no greater than 20 parts by mass relative to 100 parts by mass of the binder resin.

(Charge Control Agent)

The charge control agent is used for the purpose of imparting excellent charge stability and excellent charge rise characteristics to the first toner, for example. The charge rise characteristic of the first toner serves as an indicator as to whether the first toner can be charged to a specific charge level in a short period of time. Examples of the charge control agent include a positive charge control agent and a negative charge control agent. Cationic strength (positive chargeability) of the first toner can be increased through the toner mother particles containing a positive charge control agent. Anionic strength (negative chargeability) of the first toner can be increased through the toner mother particles containing a negative charge control agent. Examples of the positive charge control agent include pyridine, nigrosine, and quaternary ammonium salt. Examples of the negative charge control agent include metal-containing azo dye, sulfo group-containing resin, oil-soluble dye, metal salts of naphthenic acid, metal acetylacetonate complexes, salicylic acid-based metal complexes, boron compounds, fatty acid soap, and long-chain alkyl carboxylic acid salts. However, the charge control agent need not be contained in the toner mother particles when sufficient chargeability of the first toner can be ensured. The amount of the charge control agent is preferably at least 0.1 parts by mass and no greater than 10.0 parts by mass relative to 100 parts by mass of the binder resin.

(Releasing Agent)

The releasing agent is used for the purpose of imparting excellent hot offset resistance to the first toner, for example. Examples of the releasing agent include aliphatic hydrocarbon-based waxes, oxides of aliphatic hydrocarbon-based waxes, plant-derived waxes, animal-derived waxes, mineral-derived waxes, ester waxes of which main component is fatty acid ester, and waxes in which a part or all of a fatty acid ester has been deoxidized. Examples of the aliphatic hydrocarbon-based waxes include polyethylene waxes (e.g., low molecular weight polyethylene), polypropylene waxes (e.g., low molecular weight polypropylene), polyolefin copolymers, polyolefin wax, microcrystalline wax, paraffin wax, and Fischer-Tropsch wax. Examples of the oxides of aliphatic hydrocarbon-based waxes include oxidized polyethylene wax and block copolymers of oxidized polyethylene wax. Examples of the plant-derived waxes include candelilla wax, carnauba wax, Japan wax, jojoba wax, and rice wax. Examples of the animal-derived waxes include beeswax, lanolin, and spermaceti. Examples of the mineral-derived waxes include ozokerite, ceresin, and petrolatum. Examples of the ester waxes of which main component is fatty acid ester include montanic acid ester wax and castor wax. Examples of the waxes in which a part or all of a fatty acid ester has been deoxidized include deoxidized carnauba wax. The amount of the colorant is preferably at least 1 part by mass and no greater than 20 parts by mass relative to 100 parts by mass of the binder resin.

Note that the first toner particles may contain any known additive as necessary. The first toner particles preferably have a volume median diameter of at least 4 μm and no greater than 12 μm. The volume median diameter of the toner mother particles is preferably at least 4 μm and no greater than 12 μm, and more preferably at least 5 μm and no greater than 9 μm. When the first developer is used as an initial developer, the first toner in the first developer has a percentage content (toner concentration) of at least 1% by mass and no greater than 15% by mass, and more preferably at least 3% by mass and no greater than 10% by mass. The first toner has been described so far.

<Second Toner>

The second toner includes second toner particles. As described previously, the second toner particles each include a toner mother particle and external additive particles. The type, size (e.g., number average primary particle diameter), and amount of each component of the second toner particles can be the same as those exemplified in the description of the first toner particles. Therefore, description is omitted of the external additive particles and the toner mother particles of the second toner particles. The first toner particles and the second toner particles are preferably identical toner particles. Note that the identical toner particles means toner particles where the type, size, and amount of each component thereof are all identical.

When the second developer is used as a replenishment developer, the second toner in the second developer has a percentage content of preferably at least 50% by mass and no greater than 99% by mass, and more preferably at least 80% by mass and no greater than 95% by mass. The second toner has been described so far.

<First Carrier>

The first carrier includes first carrier particles. As described previously, the first carrier particles each include a first carrier mother particle and strontium titanate particles.

<Strontium Titanate Particles>>

In terms of forming images with desired image density and less fogging, the strontium titanate particles have a number average primary particle diameter of preferably at least 15 nm and no greater than 85 nm, more preferably at least 20 nm and no greater than 80 nm, further preferably at least 20 nm and no greater than 60 nm, and particularly preferably at least 25 nm and no greater than 40 nm.

In terms of forming images with desired image density and less fogging, the amount of the strontium titanate particles is preferably at least 0.02 parts by mass and no greater than 0.06 parts by mass relative to 100.00 parts by mass of the first carrier mother particles, and more preferably at least 0.03 parts by mass and no greater than 0.05 parts by mass.

The strontium titanate particles may be doped. When the strontium titanate particles are doped, the amount of a doped element may be no greater than 1.00% by mass, no greater than 0.10% by mass, or less than 0.01% by mass relative to the total mass of the strontium titanate particles. However, the strontium titanate particles may not be doped. The strontium titanate particles may be constituted by non-doped strontium titanate. For example, the strontium titanate particles may be constituted by strontium titanate to which lanthanum and Group 5 Elements (e.g., niobium or tantalum) of the Periodic Table are not doped.

<<First Carrier Mother Particles>>

As described previously, the first carrier mother particles each include a carrier core and a coat layer. In terms of forming images with desired image density and less fogging, the mass ratio (also referred to below as coat layer/core ratio) of the coat layers to the carrier cores is preferably at least 0.5% by mass and no greater than 5.0% by mass, and more preferably at least 1.2% by mass and no greater than 2.5% by mass.

(Carrier Cores)

The carrier cores contain a magnetic material, for example. Examples of the magnetic material contained in the carrier cores include metal oxides. More specific examples thereof include magnetite, maghemite, and ferrite. Ferrite has high fluidity and tends to be chemically stable. Therefore, the carrier cores preferably contain ferrite in terms of forming high-quality images for a long period of term. Examples of the ferrite include barium ferrite, manganese ferrite (Mn-ferrite), Mn—Zn ferrite, Ni—Zn ferrite, Mn—Mg ferrite, Ca—Mg ferrite, Li ferrite, and Cu—Zn ferrite. The shape of the carrier cores is not particularly limited and can be irregular or spherical. The carrier cores can be commercially available. Furthermore, the carrier cores may be self-made by pulverizing and baking a magnetic material.

The carrier cores have a volume median diameter of preferably at least 15.0 μm and no greater than 65.0 μm, and more preferably at least 30.0 μm and no greater than 50.0 μm. As a result of the volume median diameter of the carrier cores being set to at least 15.0 μm, a defect (carrier development) in which the first carrier particles attach to a photosensitive member is less likely to occur. This can inhibit travel of the first carrier particles attached to the photosensitive member from the photosensitive member to a transfer belt, thereby achieving inhibition of occurrence of image defects such as a transfer defect. Also, occurrence of poor cleaning can be inhibited because carrier development hardly occurs. As a result of the volume median diameter of the carrier cores being set to no greater than 65.0 μm by contrast, the magnetic brush of the developer set of the present disclosure formed on the circumferential surface of a developer bearing member in image formation is thick, thereby achieving formation of high-quality images.

Preferably, the carrier cores have a saturation magnetization of at least 65 emu/g and no greater than 90 emu/g. When the carrier cores contain Mn-ferrite, the saturation magnetization of the carrier cores tends to decrease as the percentage content of Mn is increased. When the carrier cores contain Mn—Mg ferrite, the saturation magnetization of the carrier cores also tends to decrease as the percentage content of Mg is increased.

(Coat Layers)

As described previously, the coat layers contain a coating resin, barium titanate particles, and carbon black particles as necessary.

The coating resin is described below. The coating resin includes silicone resin. As a result of the coating resin including the silicone resin, the first toner or the second toner can be frictionally charged in a favorable manner. Preferable examples of the silicone resin include silicone resins with a methyl group and an epoxy resin-modified silicone resin. An example of the silicone resins with a methyl group is a silicone resin with a methyl group and no phenyl groups. Another example of the silicone resins with a methyl group is a silicone resin (also referred to below as methylphenyl silicone resin) with a methyl group and a phenyl group. The coat layers may contain only the silicone resin as the coating resin or further contain a resin other than the silicone resin. The silicone resin has a percentage content of preferably at least 80% by mass to the mass of the coating resin, more preferably at least 90% by mass, and particularly preferably 100% by mass. The coating resin has been described so far.

The barium titanate particles are described next. In order to form images with desired image density and less fogging, the content ratio of the barium titanate particles is preferably at least 2 parts by mass and no greater than 47 parts by mass to 100 parts by mass of the coating resin, more preferably at least 3 parts by mass and no greater than 35 parts by mass, and further preferably at least 10 parts by mass and no greater than 25 parts by mass. When the coating resin includes two or more resins, the mass of the coating resin means the total mass of the two or more resins.

The barium titanate particles have a number average primary particle diameter of at least 100 nm and no greater than 500 nm as described previously, preferably at least 150 nm and no greater than 450 nm, and more preferably at least 250 nm and no greater than 350 nm. In terms of achieving easy and uniform dispersion in the coating resin, the barium titanate particles are preferably constituted by a hydrothermal compound. The barium titanate particles have been described so far.

The carbon black particles are described next. The carbon black particles are conductive. As such, when the coat layers contain the carbon black particles, charge can smoothly move from the first carrier particles to the first toner particles or the second toner particles. As a result, the first toner particles or the second toner particles can be charged to a desired amount of charge, thereby achieving formation of images with desired image density and less fogging.

The carbon black articles have a number average primary particle diameter of preferably at least 10 nm and no greater than 80 nm, and more preferably at least 30 nm and no greater than 45 nm. The carbon black particles have a dibutyl phthalate (DBP) oil absorption of preferably at least 300 $cm^3/100$ g and no greater than 700 $cm^3/100$ g, and more preferably at least 400 $cm^3/100$ g and no greater than 600 $cm^3/100$ g. The carbon black particles have a BET specific surface area of preferably at least 1000 $m^2/g$ and no greater than 2000 $m^2/g$, and more preferably at least 1200 $m^2/g$ and no greater than 1500 $m^2/g$. The amount of the carbon black particles is preferably at least 1 part by mass and no greater than 20 parts by mass relative to 100 parts by mass of the coating resin, and more preferably at least 5 parts by mass and no greater than 12 parts by mass. The carbon black particles have been described so far.

Note that the first carrier particles may include additional carrier external additive particles as necessary. The additional carrier external additive particles are appropriately selected from among known external additives. Alternatively, the first carrier particles may further contain any known additive. Preferably, the first carrier particles have a volume median diameter of at least 25 μm and no greater than 100 μm. The first carrier has been described so far.

In terms of achieving formation of images with desired image density even in a low-temperature and low-humidity environment and formation of images with less fogging even in a high-temperature and high-humidity environment, a distance L in the first developer calculated using the following equation is preferably at least −15 nm and no greater than 95 nm, more preferably at least 5 nm and no greater than 65 nm, and further preferably at least 5 nm and no greater than 25 nm.

Distance $L$=(number average primary particle diameter of spacer particles of first toner particles)−((number average primary particle diameter of strontium titanate particles)+(number average primary particle diameter of silica particles of first toner particles))

Figure 2:
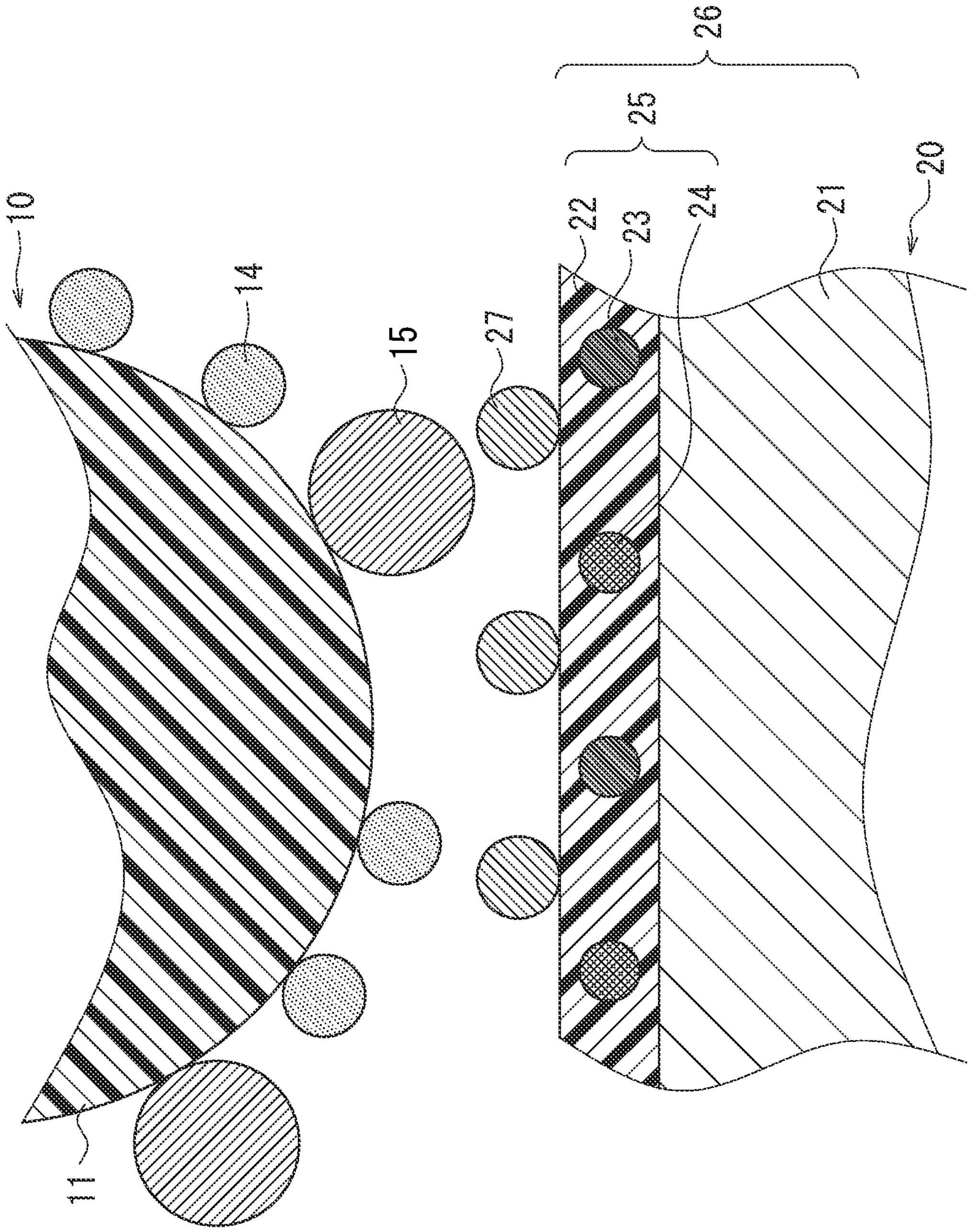
FIG. 2 is a cross-sectional view of an example of a state in which the first toner particle and the first carrier particle are close to each other.

The following describes reasons why the distance L is preferably in the above range with reference to FIG. 2. FIG. 2 is a cross-sectional view of a state in which the first toner particle 10 and the first carrier particle 20 in FIG. 1 are close to each other. In order for the first toner particles 10 to be charged normally, the silica particles 14, which significantly contribute to chargeability of the first toner particles 10, should be close to some extent to the first carrier particles 20 which is a charge supply source. Furthermore, in order for the first toner particles 10 not to be excessively charged, the strontium titanate particles 27 with charge extracting properties needs to be close to some extent to the silica particles 14. However, when the spacer particles 15 are excessively large, the spacer particles 15 inhibit proximity between the silica particles 14 and the first carrier particles 20 (particularly, the strontium titanate particles 27). As such, the first toner particles 10 can be appropriately charged by setting the distance L to a specific value or smaller (no greater than 95 nm) to achieve proximity to some extent between the silica particles 14 and the first carrier particles 20. When the spacer particles 15 are excessively small by contrast, the silica particles 14 and the first carrier particles come in contact with each other excessively to cause the silica particles to be easily buried into the toner mother particles 11 and cause the strontium titanate particles 27 to be easily buried in the coat layers 25. As such, by setting the distance L to a specific value or greater (at least −15 nm), burial of the silica particles 14 in the toner mother particles 11 and burial of the strontium titanate particles 27 in the coat layers 25 can be inhibited, thereby increasing charge stability of the first toner particles 10 in the developer set of the present disclosure. The distance L has been described so far with reference to FIG. 2.

<Second Carrier>

The second carrier includes second carrier particles. The second carrier particles each include a second carrier mother particle as described previously. The type, size (e.g., number average primary particle diameter), and amount of each component of the second carrier mother particles can be the same as those exemplified in the description of the first carrier mother particles. Therefore, description of the second carrier mother particles is omitted.

The second carrier particles substantially include no strontium titanate particles. The phrase substantially including no strontium titanate particles means inclusion of no strontium titanate particles or a content ratio of strontium titanate particles being no greater than 0.01 parts by mass to 100.00 parts by mass of the second carrier mother particles. Note that the second carrier particles may include additional carrier external additive particles or substantially include no additional carrier external additive particles. The second carrier has been described so far.

<First Developer Production Method>

The following describes an example of a method for producing the first developer. The method for producing the first developer includes a process of forming the first toner, a process of forming the first carrier, and a process of mixing the first toner and the first carrier, for example.

(Process of Forming First Toner)

In the process of forming the first toner, the binder resin, the colorant, the charge control agent, and the releasing agent are mixed to yield a mixture. The resultant mixture was melt-kneaded to obtain a melt-kneaded product. The melt-kneaded product is pulverized to obtain a pulverized product. The resultant pulverized product is classified to obtain the toner mother particles. The toner mother particles and the external additive particles (the silica particles, the spacer particles, and any other additional toner external additive particles) are mixed using a mixer. Through mixing, the external additive particles are attached to the surfaces of the toner mother particles, thereby obtaining the first toner containing the first toner particles. Preferably, mixing with the external additive particles is performed under a condition where the external additive particles are not completely buried in the toner mother particles.

(Process of Forming First Carrier)

The process of forming the first carrier includes a process of forming the first carrier mother particles and a process of adding the external additive particles to the first carrier mother particles.

In the process of forming the first carrier mother particles, the coat layers are formed on the surfaces of the carrier cores to obtain the first carrier mother particles. For example, a coating liquid containing the coating resin, the barium titanate particles, and optional carbon black particles is sprayed toward the carrier cores in a fluid bed. Next, the carrier cores toward which the coating liquid has been sprayed are heated at a first specific temperature (also referred to below as specific dry temperature) to dry the coating liquid attached to the surfaces of the carrier cores, thereby obtaining a dried product. Next, the dried product is heated at a second specific temperature (also referred to below as specific baking temperature) using an electric furnace to harden the coating resin contained in the coating liquid on the surfaces of the carrier cores. In the manner described above, the coat layers are formed on the surfaces of the carrier cores. The specific dry temperature is preferably at least 70° C. and no greater than 85° C. The specific baking temperature is preferably at least 200° C. and no greater than 300° C.

In the process of adding the external additive to the first carrier mother particles, the first carrier mother particles and the strontium titanate particles are mixed using a mixer. Through mixing, the strontium titanate particles are attached to the surfaces of the first carrier mother particles to obtain the first carrier containing the first carrier particles. Mixing with the strontium titanate particles is preferably performed under a condition where the strontium titanate particles are not completely buried in the first carrier mother particles.

(Process of Mixing First Toner and First Carrier)

In the process of mixing the first toner and the first carrier, the first toner and the first carrier are mixed using a mixer to obtain the first developer.

<Second Developer Production Method>

The following describes an example of a method for producing the second developer. The method for producing the second developer includes a process of forming the second toner, a process of forming the second carrier, and a process of mixing the second toner and the second carrier, for example. The details of the process of forming the second toner can be the same as those exemplified in the process of forming the first toner, and therefore duplicate description is omitted.

(Process of Forming Second Carrier)

The process of forming the second carrier includes a process of forming the second carrier mother particles. The process of forming the second carrier differs from the process of forming the first carrier in that the process of adding the external additive is not performed. The details of the process of forming the second carrier mother particles can be the same as those exemplified in the process of forming the first carrier mother particles, and therefore duplicate description is omitted.

(Process of Mixing Second Toner and Second Carrier)

In the process of mixing the second toner and the second carrier, the second toner and the second carrier are mixed using a mixer to obtain the second developer.

Second Embodiment: Image Forming Apparatus

The following describes an image forming apparatus according to a second embodiment. The image forming apparatus according to the second embodiment includes at least a developer set and a development device. The development device develops an electrostatic latent image with the developer set. The developer set is the developer set described in the first embodiment. The first developer is an initial developer. The second developer is a replenishment developer. The development device includes an accommodation section that accommodates the initial developer and a replenishment section that replenishes the accommodation section with the replenishment developer. As a result of including the developer set according to the first embodiment, the image forming apparatus according to the second embodiment can form images with desired image density even in a low-temperature and low-humidity environment and form images with less fogging even in a high-temperature and high-humidity environment for the same reasons as those described in the first embodiment.

Figure 3:
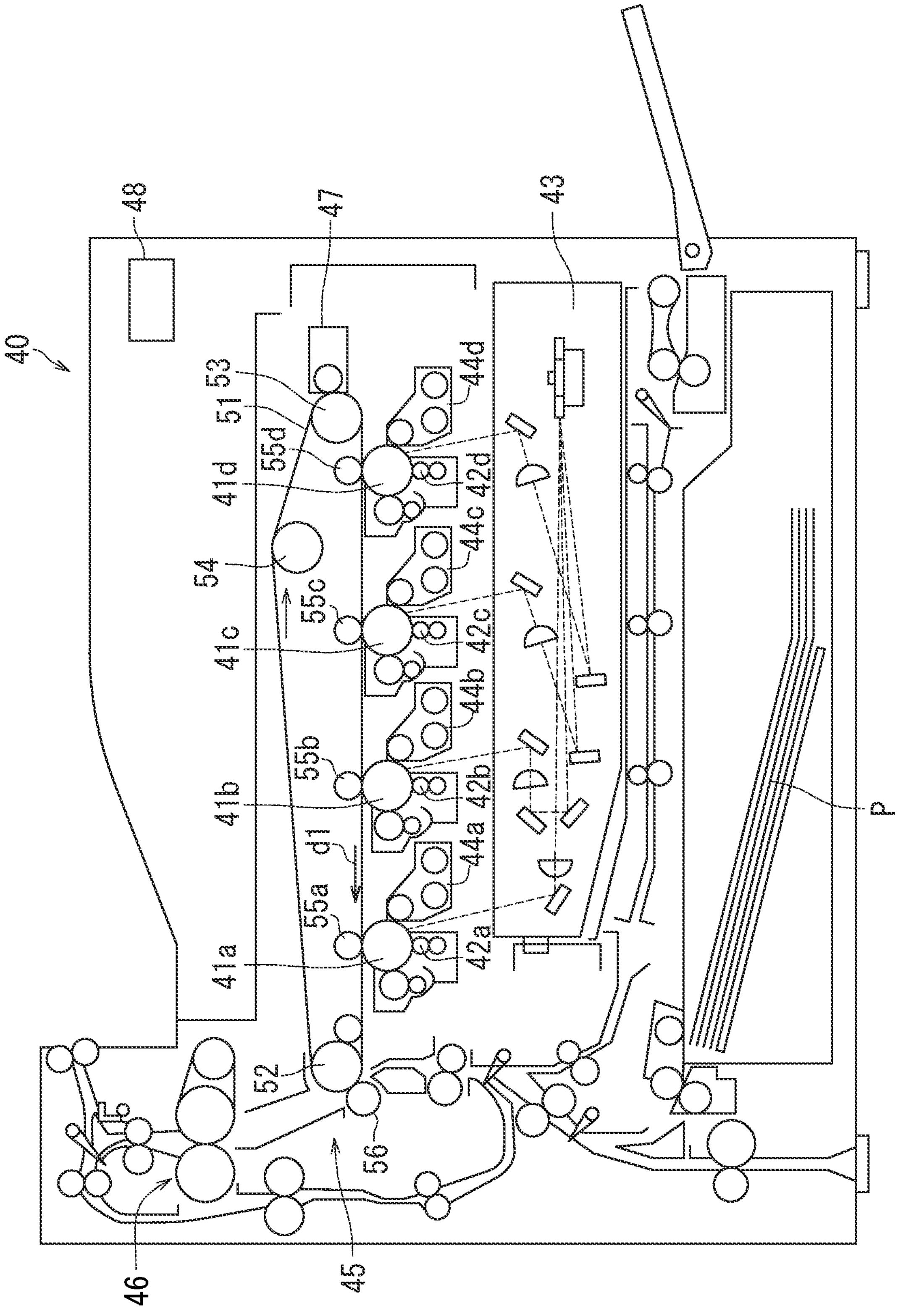
FIG. 3 is a diagram illustrating an example of an image forming apparatus according to a second embodiment of the present disclosure.

With reference to FIG. 3, an image forming apparatus 40, which is an example of the image forming apparatus according to the second embodiment, is described below.

The image forming apparatus 40 illustrated in FIG. 3 includes a developer (an in-use developer D and a replenishment developer E, see FIG. 4), a photosensitive member 41*a* to a photosensitive member 41*d*, a charger 42*a* to a charger 42*d*, a light exposure device 43, a development device 44*a* to a development device 44*d*, a transfer device 45, a fixing device 46, a cleaning device 47, and a controller 48. In the following, the photosensitive member 41*a* to the photosensitive member 41*d* are each referred to as photosensitive member 41, the charger 42*a* to the charger 42*d* are each referred to as to charger 42, and the development device 44*a* to the development device 44*d* are each referred to as development device 44 where there is no need to distinguish them.

The in-use developer D includes an initial developer and a replenishment developer E. The initial developer is the first developer described in the first embodiment. The replenishment developer E is the second developer described in the first embodiment.

Each of the photosensitive members 41 is cylindrical in shape. The photosensitive member 41 includes a metal-made cylindrical body (e.g., a cylindrical conductive substrate) as a core. A photosensitive layer is provided around the core. The photosensitive member 41 is supported in a rotatable manner. The photosensitive member 41 is rotationally driven by a motor (not illustrated).

Each of the chargers 42 charges the circumferential surface of a corresponding one of the photosensitive members 41.

The light exposure device 43 irradiates the charged circumferential surfaces of the photosensitive members 41 with light to form electrostatic latent images on the circumferential surfaces of the photosensitive members 41. For example, the electrostatic latent images are formed on the surface layer portions (photosensitive layers) of the photosensitive members 41 based on image data.

The development devices 44 develop the electrostatic latent images with the in-use developer D. More specifically, the development devices 44 develop the electrostatic latent images formed on the circumferential surfaces of the photosensitive members 41 into toner images with the in-use developer D. The development devices 44 are described later in detail.

The transfer device 45 includes a transfer belt 51, a drive roller 52, a driven roller 53, a tension roller 54, a primary transfer roller 55*a* to a primary transfer roller 55*d*, and a secondary transfer roller 56. In the following, the primary transfer roller 55*a* to the primary transfer roller 55*d* are each referred to as primary transfer roller 55 where there is no need to distinguish them. The transfer belt 51 is an endless belt wound among the drive roller 52, the driven roller 53, and the tension roller 54. Rotation of the drive roller 52 causes circulation of the transfer belt 51 in the clockwise direction in FIG. 3 (an arrow direction d3 in FIG. 3). The driven roller 53 and the tension roller 54 are rotationally driven by circulation of the transfer belt 51.

Once the toner images are formed on the photosensitive member 41*a* to the photosensitive member 41*d*, toner (tone images with the first toner or the second toner) attached to the photosensitive member 41*a* to the photosensitive member 41*d* is primarily transferred to the transfer belt 51 in a sequential manner by bias (voltage) application to the primary transfer roller 55*a* to the primary transfer roller 55*d*. In the manner described above, the toner images in multiple colors are superimposed on the transfer belt 51. After primary transfer, bias (voltage) is applied to the secondary transfer roller 56, thereby secondarily transferring the toner images in multiple colors on the transfer belt 51 to a recording medium P (e.g., printing paper) that is being conveyed. Thereafter, the toner images in multiple colors superimposed on the transfer belt 51 are secondarily transferred in a batch to the recording medium P. In the manner described above, an image constituted by unfixed toner is formed on the recording medium P.

After secondary transfer, the fixing device 46 applies heat and pressure to the toner (first toner or second toner) on the recording medium P to fix the toner to the recording medium P. In the manner described above, an image constituted by the fixed toner is formed on the recording medium P.

The cleaning device 47 cleans toner (first toner or second toner) remaining on the transfer belt 51 after secondary transfer.

The controller 48 electronically controls the operation of the image forming apparatus 40 based on outputs from various sensors. The controller 48 includes a central processing unit (CPU), random-access memory, and a storage device that stores programs therein and that stores specific data therein in a rewritable manner, for example. A user provides an instruction (e.g., an electric signal) to the controller 48 through an input section (not illustrated). The input section is a keyboard, a mouse, or a touch panel, for example.

<Development Device>

Figure 4:
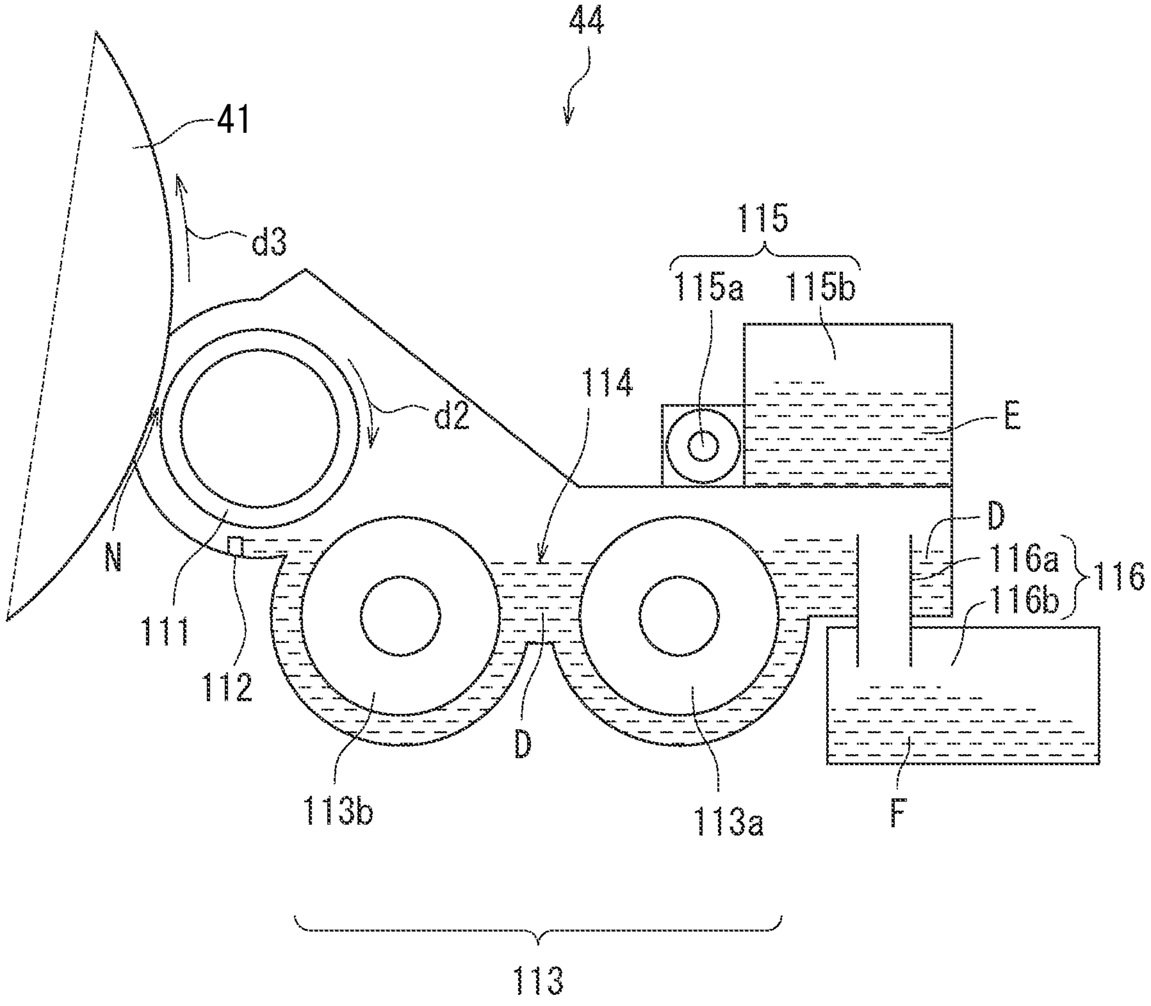
FIG. 4 is a diagram illustrating an example of a development device and its surroundings in the image forming apparatus illustrated in FIG. 3.

With reference to FIG. 4, the development devices 44 are described next further in detail. FIG. 4 illustrates a development device 44 and the peripheral part thereof in the image forming apparatus 40 illustrated in FIG. 3. The development device 44 includes at least an accommodation section 114. The development device 44 further includes a developer bearing member 111, a restriction blade 112, a plurality of stirring shafts 113, a replenishment section 115, and a discharge section 116. The development device 44 is a development device 44 of so-called trickle development type including the accommodation section 114, the replenishment section 115, and the discharge section 116.

The accommodation section 114 accommodates the in-use developer D and the stirring shafts 113. The in-use developer D accommodated in the accommodation section 114 includes the initial developer. The stirring shafts 113 include a first stirring shaft 113*a* and a second stirring shaft 113*b*. The first stirring shaft 113*a* includes a spiral stirring vane. The second stirring shaft 113*b* includes a spiral stirring vane that faces in the opposite direction (opposite phase) to the direction in which the spiral stirring vane of the first stirring shaft 113*a* faces. The first stirring shaft 113*a* conveys the in-use developer D in a first direction (direction perpendicular to the paper surface in FIG. 4 and a direction from the back to the front of the paper) from one end to the other end of the developer bearing member 111 in the axial direction thereof while stirring the in-use developer D in the accommodation section 114. The second stirring shaft 113*b* conveys the in-use developer D in a second conveyance direction opposite to the first conveyance direction while stirring the in-use developer D in the accommodation section 114. When the in-use developer D containing the toner (first toner or second doner) and the carrier (first carrier or second carrier) is stirred, the toner is charged by friction with the carrier and the charged toner is carried by the carrier. The second stirring shaft 113*b* supplies the in-use developer D to the developer bearing member 111 while conveying the in-use developer D in the second conveyance direction.

The replenishment section 115 is provided above the accommodation section 114. The replenishment section 115 replenishes the accommodation section 114 with the replenishment developer E. The replenishment section 115 includes a replenishment amount adjusting member 115*a* and a developer container 115*b*.

The replenishment amount adjusting member 115*a* controls the replenishment amount of the replenishment developer E to be supplied to the accommodation section 114 from the developer container 115*b*. The replenishment amount adjusting member 115*a* is constituted by a screw shaft of which rotation operation is controlled by the controller 48, for example. For example, the replenishment amount of the replenishment developer E can be changed according to the amount of rotation of the screw shaft.

The developer container 115*b* accommodates the replenishment developer E. The replenishment developer E in the developer container 115*b* is supplied to the accommodation section 114.

The discharge section 116 discharges the in-use developer D in the accommodation section 114. The discharge section 116 includes a discharge path 116*a* and a collection container 116*b*. The discharge path 116*a* connects the accommodation section 114 and the collection container 116*b*. When the amount of the in-use developer D in the accommodation section 114 exceeds a specific amount, excess in-use developer D flows into the discharge path 116*a* from an opening at the upper end of the discharge path 116*a*. The specific amount is an amount determined according to the position of the upper end of the discharge path 116*a*, for example. The excess in-use developer D is in-use developer D in an amount in excess of the specific amount, for example. The excess in-use developer D, after entering the discharge path 116*a*, travels downward within the discharge path 116*a* due to its own weight and flows into the collection container 116*b*. Then, the collection container 116*b* collects the excess in-use developer D as post-collection developer F (collected developer).

In the image forming apparatus 40 (e.g., an unused image forming apparatus 40) before image formation begins, the in-use developer D accommodated in the accommodation section 114 is the initial developer.

Before replenishment of the accommodation section 114 with the replenishment developer E by the replenishment section 115 starts after image formation begins, the in-use developer D accommodated in the accommodation section 114 is the initial developer. In the accommodation section 114, the stirring shafts 113 stir the initial developer to frictionally charge the first toner particles 10 contained in the initial developer. Thereafter, the stirred initial developer is carried by the developer bearing member 111.

When printing by the image forming apparatus 40 is continued, replenishment of the accommodation section 114 with the replenishment developer E and discharge of the in-use developer D from the accommodation section 114 are performed. As such, continuation of printing by the image forming apparatus 40 causes replacement of the in-use developer D accommodated in the accommodation section 114 with the replenishment developer E supplied from the replenishment section 115 little by little. Once the replenishment section 115 replenishes the accommodation section 114 with the replenishment developer E, the initial developer and the replenishment developer E are stirred by the stirring shafts 113 in the accommodation section 114, with a result that the first toner particles 10 contained in the initial developer and the second toner particles 60 contained in the replenishment developer E are frictionally charged. Thereafter, the stirred initial developer and the stirred replenishment developer E are carried by the developer bearing member 111.

The developer bearing member 111 is located in the vicinity of the photosensitive member 41. The developer bearing member 111 includes a magnet roll and a development sleeve. The magnet roll has magnetic poles at at least a surface layer portion thereof. The magnetic poles include an N pole and an S pole based on a permanent magnet, for example. The development sleeve is a non-magnetic cylinder (e.g., an aluminum pipe). The magnet roll is located in the development sleeve (cylinder), and the development sleeve is located on the surface layer portion of the developer bearing member 111. The shaft of the magnet roll, which is nonrotatable, and the development sleeve are connected to each other by a flange in a manner that the development sleeve is rotatable around the magnet roll.

As described previously, the charged toner (first toner or second toner) is carried by the carrier (first carrier or second carrier) in the accommodation section 114. The developer bearing member 111 (specifically, the development sleeve) attracts the carrier in the accommodation section 114 by the magnetic force thereof while rotating in the clockwise direction in FIG. 4 (an arrow direction d2) in FIG. 4 to carry, on the circumferential surface thereof, the carrier (i.e., the in-use developer D) carrying the toner. Thereafter, a magnetic brush is formed with the in-use developer D carried by the developer bearing member 111.

The restriction blade 112 restricts the thickness of the magnetic brush of the in-use developer D formed on the circumferential surface of the developer bearing member 111 to a specific thickness.

After the thickness of the magnetic brush is restricted by the restriction blade 112, the developer bearing member 111 (specifically, the development sleeve) further rotates in the clockwise direction (the arrow direction d2) in FIG. 4 to convey the in-use developer D to a proximal part N. The proximal part N refers to a part of a space between the photosensitive member 41 and the developer bearing member 111 that has the shortest distance therebetween. The photosensitive member 41 rotates in the anticlockwise direction (the arrow direction d3) in FIG. 4. Bias (voltage) application to the developer bearing member 111 generates a potential difference between the surface potential of the developer bearing member 111 and the surface potential of the photosensitive member 41. Due to presence of the potential difference, the toner (first toner or second toner) contained in the in-use developer D carried by the developer bearing member 111 moves to the circumferential surface of the photosensitive member 41. In detail, the charged toner contained in the in-use developer D carried by the developer bearing member 111 is attracted by electric force to an electrostatic latent image (e.g., an exposed part of which potential is reduced by light exposure to be lower than that of the non-exposed part) formed on the photosensitive member 41, thereby moving to the electrostatic latent image on the photosensitive member 41. As a result, a toner image is formed on the circumferential surface of the photosensitive member 41.

The image forming apparatus 40 according to the second embodiment has been described so far with reference to FIGS. 3 and 4. However, the image forming apparatus according to the second embodiment is not limited to the above image forming apparatus 40 and may be implemented in various manners within a scope not departing from the gist thereof. For example, some elements of configuration may be omitted from all the elements of configuration indicated in the embodiment. Properties such as material, shape, and dimension of each element of configuration are only examples and not limited particularly. Various alterations can be practiced.

EXAMPLES

The following provides further specific description of the present disclosure through use of Examples. However, the present disclosure is not limited to the scope of Examples.

[Measurement of Number Average Primary Particle Diameters]

The number average primary particle diameter of each type of particles (e.g., crosslinked resin particles, non-crosslinked resin particles, silica particles, composite particles, strontium titanate particles, barium titanate particles, and carbon black particles) described in the present examples were measured using a scanning electron microscope ("JSM-7600F", product of JEOL Ltd., field emission scanning electron microscope). In the measurement of each number average primary particle diameter, equivalent circle diameters (Heywood diameters: diameters of circles having the same areas as projected areas of the primary particles) of 100 primary particles were measured and a number average thereof was obtained. Note that in the present examples, the number average primary particle diameter may be also referred to below as "particle diameter" or "diameter" for short.

<Material>

The following types of particles were prepared as external additive particles of toners and carriers.

[Resin Particles]

A glass-made reaction vessel equipped with a thermometer (thermocouple), a stirring device, a reflux condenser, and a nitrogen gas inlet tube was set in a water bath (set temperature: 80° C.). Into the reaction vessel, 300.0 parts by mass of ion exchange water and 1.0 part by mass of di-t-butyl peroxide were added. Next, the inside of the reaction vessel was placed in a nitrogen gas atmosphere. In the operation thereafter, the temperature of the contents of the reaction vessel was kept at 80° C. and the inside of the reaction vessel was maintained in the nitrogen gas atmosphere. Next, 0.2 parts by mass of ammonium persulfate and 60.0 parts by mass of a monomer mixture were dripped into the reaction vessel over 1 hour under stirring of the contents of the reaction vessel. The monomer mixture was a mixture of 10% by mol of styrene, 40% by mol of butyl methacrylate, and 50% by mol of divinylbenzene. Next, the contents of the reaction vessel was caused to react while a reaction solution was stirred. In the reaction, a reaction temperature X was set to 100° C., a reaction time Y was set to 3 hours, and a stirring speed Z was set to 1250 rpm. The reaction solution (emulsion solution) after the reaction was dried to obtain crosslinked resin particles (number average primary diameter: 35 nm).

Non-crosslinked resin particles (number average primarily particle diameter: 35 nm) were prepared according to the same method as that for preparing the above-described crosslinked resin particles (number average primarily particle diameter: 35 nm) in all aspects other than that the monomer mixture was changed to have a composition of 20 mole percent styrene and 80 mole percent butyl methacrylate.

Crosslinked resin particles and non-crosslinked resin particles both with a number average primary particle diameter of 50 nm to 150 nm were prepared according to the same method as that for preparing the above-described crosslinked resin particles (number average primarily particle diameter: 35 nm) and the non-crosslinked resin particles (number average primarily particle diameter: 35 nm) in all aspects other than that the reaction temperature X, the reaction time Y, and the stirring speed Z were changed as shown below in Table 1.

TABLE 1

| Particle diameter [nm] | Reaction temperature X [° C.] | Reaction time Y [hour] | Stirring speed Z [rpm] |
|---|---|---|---|
| 35 | 100 | 3 | 1,250 |
| 50 | 100 | 3 | 1,000 |
| 60 | 100 | 3 | 950 |
| 80 | 100 | 4 | 900 |
| 100 | 100 | 4 | 750 |
| 120 | 100 | 4 | 600 |
| 150 | 100 | 5 | 620 |

[Silica Particles]

A raw material mixture was obtained by charging into a vessel and mixing finely pulverized silica, a carbon powder as a reductant, and an appropriate amount of water. Next, the raw material mixture was heated to approximately 1800° C. using an incinerator to generate a $SiO_2$ gas. Next, the generated $SiO_2$ gas was forcedly cooled using cooled air (flow rate X: 80 $m^3$/hour) to precipitate silica fine particles. Next, the precipitated silica fine particles were collected using a bag filter. Next, aminopropylethoxysilane and silicone oil were added to the collected silica fine particles. Next, the silica fine particles after the addition was heated to obtain a solid. Next, the resultant solid was crashed using an FM mixer to obtain silica particles D1 with a number average primary particle diameter of 100 nm.

Silica particles A1 to C1 and E1 were prepared according to the same method as that for preparing the silica particles D1 in all aspects other than that the flow rate X of the cooled air was changed as shown below in Table 2.

TABLE 2

| Silica particles | Cooled air flow rate X [$m^3$/hour] | Particle diameter [nm] |
|---|---|---|
| A1 | 140 | 40 |
| B1 | 110 | 60 |
| C1 | 85 | 80 |
| D1 | 80 | 100 |
| E1 | 65 | 140 |

[Composite Particles]

Into a vessel, 200 g of toluene as a solvent, 100 g of dimethylpolysiloxane, and 100 g of 3-aminopropyltrimethoxysilane were added. A toluene solution was obtained by dissolving the components other than the solvent in the solvent. Next, 3600 g of toluene was added (10-time dilution) to 400 g of the toluene solution to obtain a diluted toluene solution. Next, the diluted toluene solution was gradually dripped into 200 g of silica fine particles ("AEROSIL (registered Japanese trademark) R 972", product of NIPPON AEROSIL CO., LTD., fumed silica) under ultrasonic irradiation and stirring for 30 minutes to obtain a mixture. Next, the resultant mixture was heated in a thermostatic chamber at 150° C. while a rotary evaporator was used for pressure reduction to distill the toluene in the mixture, thereby obtaining a solid. Next, the resultant solid was dried using a reduced pressure dryer set at a temperature of 50° C. to obtain a dried solid. The drying was continued until volatile components were sufficiently removed from the solid and the solid did not lose any more weight. Next, the dried solid was heated at 200° C. for 3 hours under a nitrogen air flow using an electric furnace to obtain a powder. Next, the resultant powder was crashed using a jet mill (flow rate: 1 $m^3$/min) and collected using a bag filter, thereby obtaining silica particles (also referred to below as small-diameter silica particles) with a number average primary particle diameter of 20 nm.

A vessel of a mixer ("HIVIS MIX (registered Japanese trademark) Type 2P-1", product of PRIMIX Corporation) was charged with 700 g of one type of the aforementioned crosslinked particles (number average primary particle diameter: 35 nm) and 15 g of methyl hydrogen polysiloxane, and mixing and stirring were carried out for 60 minutes. In the mixing and stirring, the stirring speed of the mixer was set to 20 rpm for both the spinning speed and the revolving speed. Thereafter, 707 g of the aforementioned small-diameter silica particles (number average primary particle diameter: 20 nm) were further added into the mixer and mixing and stirring were carried out for 30 minutes. In the mixing and stirring, the stirring speed of the mixer was set to 20 rpm for both the spinning speed and the revolving speed. Through the above, the small-diameter silica particles (number average primary particle diameter: 20 nm) were attached to the surfaces of the crosslinked resin particles (number average primary particle diameter: 35 nm) covered with methyl hydrogen polysiloxane. Thereafter, the internal pressure of the vessel of the mixer was reduced for 2 hours using a rotary pump while the mixing and stirring by the mixer was kept continued, thereby drying the contents of the vessel. Thus, composite particles A2 were obtained that included the crosslinked resin particles and the small-diameter silica particles attached to the surfaces of the crosslinked resin particles. The resultant composite particles A2 had a number average primary particle diameter of 50 nm.

Composite particles B2 to D2 were prepared according to the same method as that for preparing the composite particles A2 in all aspects other than that the type of the crosslinked resin particles and the amount of the small-diameter silica particles used relative to 100 parts by mass of the crosslinked resin particles were changed as shown below in Table 3.

TABLE 3

| | Crosslinked resin particles | | Small-diameter silica particles | | |
|---|---|---|---|---|---|
| Composite particles | Part by mass | Particle diameter [nm] | Part by mass | Particle diameter [nm] | Particle diameter [nm] |
| A2 | 100 | 35 | 101 | 20 | 50 |
| B2 | 100 | 60 | 59 | 20 | 76 |
| C2 | 100 | 80 | 44 | 20 | 96 |
| D2 | 100 | 100 | 35 | 20 | 120 |

[Barium Titanate Particles]

As barium titanate particles used for developer preparation, those shown below in Table 4 were prepared.

TABLE 4

| Barium titanate particles | | |
|---|---|---|
| Manufacturer | Product name | Particle diameter [nm] |
| SAKAI CHEMICAL INDUSTRY CO., LTD. | BT-01 | 102 |
| SAKAI CHEMICAL INDUSTRY CO., LTD. | BT-03 | 304 |
| SAKAI CHEMICAL INDUSTRY CO., LTD. | BT-05 | 495 |
| SAKAI CHEMICAL INDUSTRY CO., LTD. | custom-made item | 83 |
| SAKAI CHEMICAL INDUSTRY CO., LTD. | custom-made item | 588 |

<Study 1>

First, effects of the spacer particles in the first toner particles and the second toner particles and effects of the strontium titanate particles in the first carrier particles and the second carrier particles were studied.

<Toner Preparation>

A toner (T-2) used in developer preparation was prepared according to the following method.

(Synthesis of Non-crystalline Polyester Resin (R1))

A non-crystalline polyester resin (R1) used as a binder resin in toner mother particle preparation was synthesized according to the following method. First, a reaction vessel equipped with a thermometer (thermocouple), a dewatering conduit, a nitrogen gas inlet tube, and a stirring device (stirring impeller) was set in an oil bath. The reaction vessel was charged with 1575 g of bisphenol A propylene oxide adduct (BPA-PO), 163 g of bisphenol A ethylene oxide adduct (BPA-EO), 377 g of fumaric acid, and 4 g of a catalyst (dibutyl tin oxide). Subsequently, the inside of the reaction vessel was placed in a nitrogen atmosphere and the internal temperature of the reaction vessel was raised to 220° C. using the oil bath under stirring of the contents of the reaction vessel. A polymerization reaction of the contents of the reaction vessel was caused for 8 hours while the byproduct water was distilled in the nitrogen atmosphere at a temperature of 220° C. Subsequently, the internal pressure of the reaction vessel was reduced and the polymerization reaction of the contents of the reaction vessel was further caused in the reduced pressure atmosphere (pressure: 7999 Pa) at a temperature of 220° C. Subsequently, the internal temperature of the reaction vessel was reduced to 210° C. and 336 g of trimellitic anhydride was added into the reaction vessel. The contents of the reaction vessel were then caused to react in the reduced pressure atmosphere (pressure: 7999 Pa) at a temperature of 210° C. The reaction time was adjusted so that a non-crystalline polyester resin (R1) being a reaction product had the following physical properties. Thereafter, the reaction product was taken out of the reaction vessel and cooled to obtain the non-crystalline polyester resin (R1) with the following physical properties. Note that the resultant polyester resin (R1) was determined to be non-crystalline because an endothermic peak was not definitely identified on an endothermic curve of the polyester resin (R1) plotted using a differential scanning calorimeter to disable determination of a definite melting point.

(Physical Properties of Non-crystalline Polyester Resin (R1))

Softening point (Tm): 100° C.
Glass transition point (Tg): 50° C.
Mass average molecular weight (Mw): 30,000
Acid value: 15 mgKOH/g
Hydroxyl value: 30 mgKOH/g (Toner Mother Particle Preparation)

Using an FM mixer ("FM-10B", product of Nippon Coke & Engineering Co., Ltd.), 100 parts by mass of a binder resin, 4 parts by mass of a colorant, 1 part by mass of a charge control agent, and 5 parts by mass of a releasing agent were mixed to yield a mixture. The binder resin used was the non-crystalline polyester resin (R1). The colorant used was a copper phthalocyanine blue pigment (C.I. Pigment Blue 15:3). The charge control agent used was a quaternary ammonium salt ("BONTRON (registered Japanese trademark) P-51", product of ORIENT CHEMICAL INDUSTRIES CO., LTD.). The releasing agent used was a carnauba wax ("SPECIAL CARNAUBA WAX No. 1", product of S. Kato & Co.). The resultant mixture was melt-kneaded using a twin screw extruder ("PCM-30", product of Ikegai Corp.) to obtain a melt-kneaded product. The resultant melt-kneaded product was pulverized using a mechanical pulverizer ("TURBO MILL", product of FREUND-TURBO CORPORATION) to obtain a pulverized product. The resultant pulverized product was classified using a classifier ("ELBOW JET", product of Nittetsu Mining Co., Ltd.). Through the above, toner mother particles in powder form with a volume median diameter of 6.8 μm were obtained.

(External Additive Addition to Toner Mother Particles)

Using an FM mixer ("FM-10B", product of Nippon Coke & Engineering Co., Ltd.), 100.0 parts by mass of the toner mother particles obtained above, 0.5 parts by mass of one type of the aforementioned crosslinked resin particles (number average primary particle diameter: 60 nm), 1.0 part by mass of the aforementioned small-diameter silica particles (number average primary particle diameter: 20 nm), and 0.75 parts by mass of aluminum oxide particles ("AEROXIDE (registered Japanese trademark) Alu C805", product of NIPPON AEROSIL CO., LTD., BET specific surface area: 75 to 105 $m^2/g$) were mixed at 4000 rpm for 5 minutes to obtain a mixture. The resultant mixture was sifted using a 200-mesh sieve (opening 75 μm) to obtain the toner (T-2). Note that the aforementioned aluminum oxide particles had a number average primary particle diameter of greater than 300 nm and were therefore an external additive not corresponding to the spacer particles.

Toners (T-1) and (T-3) to (T-5) were prepared according to the same method as that for preparing the toner (T-2) in all aspects other than that the material and amount of each component were changed as shown below in Table 5.

TABLE 5

| Toner | | | | | | | |
| --- | --- | --- | --- | --- | --- | --- | --- |
| | External additive particles | | | | | | |
| | Mother | Alumina | Small-diameter silica particles | | Spacer particles | | |
| Type | particles Part | particles Part | Part | Diameter [nm] | Type | Part | Diameter [nm] |
| T-1 | 100 | 0.75 | 1 | 20 | — | — | — |
| T-2 | 100 | 0.75 | 1 | 20 | Crosslinked resin particles | 0.5 | 60 |
| T-3 | 100 | 0.75 | 1 | 20 | Non-crosslinked resin particles | 0.5 | 60 |
| T-4 | 100 | 0.75 | 1 | 20 | Large-diameter silica particles | 0.5 | 60 |
| T-5 | 100 | 0.75 | 1 | 20 | Composite particles C2 | 0.5 | 96 |

<Carrier Preparation>

A carrier (C-2) used in developer preparation was prepared according to the following method.

(Preparation of Coating Liquid (L1))

A coating liquid (L1) was prepared for use in formation of coat layers of the carriers. A stainless steel vessel was charged with 361.2 g of a silicone resin solution (solid content: 161.1 g), 36.2 g of barium titanate particles, 14.4 g of carbon black, and 1444.8 g of toluene. The vessel contents were mixed using a homogenizer to obtain the coating liquid (L1). The silicone resin solution used was "KR-255" (product of Shin-Etsu Chemical Co., Ltd., solid content: methylphenyl silicone resin, solid concentration: 50% by mass). The barium titanate particles used were "BT-01" (product of SAKAI CHEMICAL INDUSTRY CO., LTD., number average primary particle diameter: 304 nm). The carbon black used was "KETJEN BLACK (registered Japanese trademark) EC300J" (product of Lion Specialty Chemicals Co., Ltd., number average primary particle diameter: 39.5 nm) being a conductive carbon black.

(Carrier Mother Particle Preparation)

The coating liquid (L1) was sprayed toward 5000 g of carrier cores while the carrier cores were allowed to flow using a fluidized bed coating apparatus ("FD-MP-01 Type D", product of Powrex Corporation). The carrier cores used were manganese ferrite cores (product of DOWA IP CREATION CO., LTD., volume median diameter: 40 μm, saturation magnetization: 67 emu/g). Coating was done under conditions of a fed air temperature of 75° C., a fed flow rate of 0.3 $m^3$/min, and a rotor rotational speed of 400 rpm. The amount of the coating liquid (L1) loaded into the fluidized bed coating apparatus was adjusted so that the coat layer/core ratio was 1.5% by mass (i.e., so that the mass of the coat layers formed by heating was 15 g relative to 1000 g of the carrier cores). Carrier cores coated with the coating liquid (L1) were obtained by the spraying. Next, the carrier cores coated with the coating liquid (L1) were baked at 200° C. for 1 hour using an electric furnace to form coat layers on the surfaces of the carrier cores. Through the above, carrier mother particles were obtained.

(External Additive Addition to Carrier Mother Particles)

Using a ROCKING MIXER (registered Japanese trademark) "RM-10" produced by AICHI ELECTRIC CO., LTD., 100.00 parts by mass of the carrier mother particles obtained above and 0.04 parts by mass of strontium titanate particles were mixed for 30 minutes to attach the strontium titanate particles to the surfaces of the carrier mother particles. In the manner described above, the carrier (C-2) containing carrier particles was obtained. The strontium titanate particles used were non-doped strontium titanate particles (particle size adjusted product of "SW-100" produced by Titan Kogyo, Ltd.) with the number average primary particle diameter adjusted to 30 nm.

A carrier (C-1) was prepared according to the same method as that for preparing the carrier (C-2) in all aspects other than that the material and amount of each component were changed as shown below in Tables 6 and 7. In the preparation of the carrier (C-1) for which "-" is indicated under "Strontium titanate particles", external additive addition itself was not carried out.

TABLE 6

| Carrier | | | | | |
| --- | --- | --- | --- | --- | --- |
| | Overall configuration | | | | |
| | Carrier cores | | | Strontium titanate particles | |
| Type | Part | Diameter [μm] | Coat layers Part | Part | Diameter [μm] |
| C-1 | 100 | 40 | 1.5 | — | — |
| C-2 | 100 | 40 | 1.5 | 0.04 | 30 |

TABLE 7

| Carrier | | | | | | | |
| --- | --- | --- | --- | --- | --- | --- | --- |
| | Coat layer composition | | | | | | |
| | | | Barium titanate particles | | Carbon black particles | | |
| | Silicone resin | | | Diameter | | | Diameter |
| Type | Type | Part | Part | [nm] | Type | Part | [nm] |
| C-1 | KR-255 | 100 | 20 | 304 | EC300J | 8 | 39.5 |
| C-2 | KR-255 | 100 | 20 | 304 | EC300J | 8 | 39.5 |

The terms in Tables 5 to 7 mean as follows. Also, "Part" under "Silicone resin" in Table 7 indicates part by mass in terms of solid content. The same definitions of terms apply to the following tables.

"Diameter": number average primary particle diameter

"Part": parts by mass

"-": no corresponding component being not used

[Preparation of Developer (A-4)]

In the following, the method for preparing a developer (A-4) is described followed by description of a method for preparing the other developers.

<Developer Preparation>

Using a ROCKING MIXER (registered Japanese trademark) "RM-10" produced by AICHI ELECTRIC CO., LTD., 92 parts by mass of the carrier (C-2) and 8 parts by mass of the toner (T-2) were mixed for 30 minutes. In the manner described above, the developer (A-4) to be used as an initial developer was obtained. The developer (A-4) had a toner concentration of 8% by mass.

The distance L of the developer (A-4) was 10 nm as indicated below.

Distance $L$=(number average primary particle diameter (60 nm) of spacer particles)−(number average primary particle diameter (20 nm) of first silica particles (small-diameter silica particles))+(number average primary particle diameter (30 nm) of strontium titanate particles)=10 nm Developers (A-1) to (A-3) and (A-5) to (A-7) each used as an initial developer were prepared according to the same method as that for preparing the developer (A-4) in all aspects other than that the combination of the toner and the carrier was changed as shown below in Table 8.

[Preparation of Developers (B-1) to (B-9)]

Developers (B-1) to (B-9) each used as a replenishment developer were prepared according to the same method as that for preparing the developer (A-4) in all aspects other than the following changes. In the preparation of the developers (B-1) to (B-9), the combination of the toner and the carrier was changed as shown below in Table 8. Furthermore, in the preparation of each of the developers (B-1) to (B-9), a ROCKING MIXER (registered Japanese trademark) ("RM-10", product of AICHI ELECTRIC CO., LTD.) was used to mix 10 parts by mass of the carrier and 90 parts by mass of the toner (toner concentration 90% by mass) for 30 minutes.

Examples 1 to 4 and Comparative Examples 1 to 5

As shown in Table 8, developer sets of Examples 1 to 4 and Comparative Examples 1 to 5 were obtained by combining any of the initial developers (A-1) to (A-7) and any of the replenishment developers (B-1) to (B-9). Table 8 below also shows the distance L in each developer.

TABLE 8

| | Initial developer | | | | Replenishment developer | | | |
|---|---|---|---|---|---|---|---|---|
| | Type | Toner | Carrier | L [nm] | Type | Toner | Carrier | L [nm] |
| Comparative Example 1 | A-1 | T-1 | C-1 | −20 | B-1 | T-1 | C-1 | −20 |
| Comparative Example 2 | A-2 | T-1 | C-2 | −50 | B-2 | T-1 | C-1 | −20 |
| Comparative Example 3 | A-3 | T-2 | C-1 | 40 | B-3 | T-2 | C-1 | 40 |
| Example 1 | A-4 | T-2 | C-2 | 10 | B-4 | T-2 | C-1 | 40 |
| Example 2 | A-5 | T-3 | C-2 | 10 | B-5 | T-3 | C-1 | 40 |
| Example 3 | A-6 | T-4 | C-2 | 10 | B-6 | T-4 | C-1 | 40 |
| Example 4 | A-7 | T-5 | C-2 | 46 | B-7 | T-5 | C-1 | 76 |
| Comparative Example 4 | A-4 | T-2 | C-2 | 10 | B-8 | T-2 | C-2 | 10 |
| Comparative Example 5 | A-7 | T-5 | C-2 | 46 | B-9 | T-5 | C-2 | 46 |

[Evaluation 1]

With respect to each of the developer sets of Examples 1 to 4 and Comparative Examples 1 to 5, image density in a low-temperature and low-humidity environment and fogging in a high-temperature and high-humidity environment were evaluated according to the following methods. Evaluation results are shown below in Table 9.

<Evaluation Apparatus>

As each of evaluation apparatuses (evaluation apparatuses T1 and T2), "TASKalfa 7054ci" produced by KYOCERA Document Solutions Inc. was used. The evaluation apparatuses T1 and T2 each included an amorphous silicon drum being a photosensitive member and a development device using two-component developers. The development devices each had the configuration described with reference to FIG. 4.

Of one of the developer sets shown in Table 8, the initial developer was loaded into the accommodation section of the development device and the replenishment developer was loaded into the replenishment section of the development device.

<Image Formation>

Printing was carried out in an environment (low-temperature and low-humidity environment) at a temperature of 10° C. and a relative humidity of 15%. Using the evaluation apparatus T1, intermittent printing was carried out by which an image (character pattern image with a printing rate of 4%) was printed intermittently on 1,000 sheets of paper (first consecutive printing). Note that the intermittent printing means repetition of a series of operations of consecutive printing on 7 sheets of the paper and temporary stop thereafter. After the first consecutive printing, an image A3 (image including a solid image area and a blank area) was printed on one sheet of paper in an environment at a temperature of 10° C. and a relative humidity of 15% using the evaluation apparatus T1. Next, intermittent printing was carried out by which an image (character pattern image with a printing rate of 4%) was printed intermittently on 99,000 sheets of paper (second consecutive printing) in an environment at a temperature of 10° C. and a relative humidity of 15% using the evaluation apparatus T1. After the second consecutive printing, an image B3 (image including a solid image area and a blank area) was printed on one sheet of paper in an environment at a temperature of 10° C. and a relative humidity of 15% using the evaluation apparatus T1.

Next, printing was carried out in an environment (low-temperature and low-humidity environment) at a temperature of 10° C. and a relative humidity of 15% using an evaluation apparatus T2 different from the evaluation apparatus T1. Using the evaluation apparatus T2, intermittent printing was carried out by which an image (character pattern image with a printing rate of 4%) was printed intermittently on 1,000 sheets of paper (first consecutive printing). Note that the intermittent printing was repetition of a series of operations of consecutive printing on 7 sheets of the paper and temporary stop thereafter. After the first consecutive printing, the evaluation apparatus T2 was left to stand for 24 hours in an environment (high-temperature and high-humidity environment) at a temperature of 32.5° C. and a relative humidity of 80%. Thereafter, an image C3 (image including a solid image area and a blank area) was printed on one sheet of paper in the same environment as above using the evaluation apparatus T2. Next, intermittent printing was performed by which an image (character pattern image with a printing rate of 4%) was intermittently printed on 99,000 sheets of paper (second consecutive printing) in an environment at a temperature of 10° C. and a relative humidity of 15% using the evaluation apparatus T2. After the second consecutive printing, the evaluation apparatus T2 was left to stand for 24 hours in an environment at a temperature of 32.5° C. and a relative humidity of 80%. Thereafter, an image D3 (image including a solid image area and a blank area) was printed on one sheet of paper in the same environment as above using the evaluation apparatus T2.

<Image Density>

The reflection density (image density) of the solid image area of each of the images A3 and B3 was measured using a reflectance densitometer ("SpectroEye (registered Japanese trademark)", product of X-Rite Inc.). The image densities of the images A3 and B3 were taken to be $ID_{1k}$ and $ID_{100k}$, respectively. Image density was evaluated according to the following criteria.

(Criteria of Image Density)

A (very good): image density of at least 1.3

B (good): image density of at least 1.0 and less than 1.3

C (poor): image density of less than 1.0

<Fogging>

The reflection density of an unprinted sheet of paper and the reflection density of the blank area of the sheet with the image C3 or the image D3 printed thereon were measured using a white light meter ("TC-6DS", product of Tokyo Denshoku Co., Ltd.). A fogging density was calculated using an equation "fogging density=(reflection density of blank area)−(reflection density of unprinted sheet of paper)". The fogging densities of the image C3 and the image D3 were taken to be $FD_{1k}$ and $FD_{100k}$, respectively. Fogging density was evaluated according to the following criteria.

(Criteria of Fogging)

A (very good): fogging density of less than 0.002

B (good): fogging density of at least 0.002 and no greater than 0.005

C (poor): fogging density of greater than 0.005

TABLE 9

| | Developer | | Image density | | | | Fogging | | | |
|---|---|---|---|---|---|---|---|---|---|---|
| | Initial | Replenishment | $ID_{1k}$ | Rating | $ID_{100k}$ | Rating | $FD_{1k}$ | Rating | $FD_{1000k}$ | Rating |
| Comparative Example 1 | A-1 | B-1 | 0.98 | C | 1.42 | A | 0.000 | A | 0.001 | A |
| Comparative Example 2 | A-2 | B-2 | 0.97 | C | 1.40 | A | 0.000 | A | 0.001 | A |
| Comparative Example 3 | A-3 | B-3 | 0.98 | C | 1.40 | A | 0.001 | A | 0.000 | A |
| Example 1 | A-4 | B-4 | 1.41 | A | 1.40 | A | 0.001 | A | 0.000 | A |
| Example 2 | A-5 | B-5 | 1.43 | A | 1.41 | A | 0.001 | A | 0.001 | A |
| Example 3 | A-6 | B-6 | 1.42 | A | 1.42 | A | 0.001 | A | 0.000 | A |
| Example 4 | A-7 | B-7 | 1.41 | A | 1.43 | A | 0.000 | A | 0.001 | A |
| Comparative Example 4 | A-4 | B-8 | 1.40 | A | 1.41 | A | 0.001 | A | 0.012 | C |
| Comparative Example 5 | A-7 | B-9 | 1.43 | A | 1.42 | A | 0.000 | A | 0.010 | C |

As shown in Tables 1 to 9, the developer sets of Examples 1 to 4 each had Features X. As a result, the developer sets of Examples 1 to 4 formed images with desired image density even in the low-temperature and low-humidity environment and formed images with less fogging even in the high-temperature and high-humidity environment.

By contrast, the external additive particles of the first toner particles and the second toner particles did not include spacer particles in the toner (T-1) used in the developer sets of Comparative Examples 1 and 2. In the developer sets of Comparative Examples 1 and 3, the first carrier particles of the carrier (C-1) in the initial developer included no strontium titanate particles. As a result, the developer sets of Comparative Examples 1 to 3 formed images with insufficient image density after the 1000-sheet consecutive printing.

In the developer sets of Comparative Examples 4 and 5, the second carrier particles of the carrier (C-2) in the replenishment developer included the strontium titanate particles. As a result, the developer sets of Comparative Examples 4 and 5 did not inhibit occurrence of fogging after the 100,000-sheet consecutive printing.

From the above, it is thought that it is effective that both the first toner particles and the second toner particles include the spacer particles and the first carrier particles of the initial developer include the strontium titanate particles in order to form images with desired density even in the low-temperature and low-humidity environment and form images with less fogging even in the high-temperature and high-humidity environment. By contrast, it is determined effective that the second carrier particles substantially include no strontium titanate particles in the replenishment developer.

<Study 2>

Further study was carried out next with various conditions changed.

[Developer Set Preparation]

Toners (T-6) to (T-25) were prepared according to the same method as that for preparing the toners (T-1) to (T-5) in all aspects other than that the material and amount of each component were changed as shown below in Table 10. In the preparation of the toner (T-10), a mixture was used as the spacer particles that was obtained by mixing one type of the crosslinked resin particles (number average primary particle diameter: 35 nm) and one type of the crosslinked resin particles (number average primary particle diameter: 80 nm) at a ratio of 1:2. In the toner (T-10), the number average primary particle diameter of the spacer particles was "35 nm×⅓+80 nm×⅔=65 nm".

TABLE 10

| Toner | | | | | | | |
|---|---|---|---|---|---|---|---|
| | Mother particles | External additive particles | | | | | |
| | | Alumina particles | Small-diameter silica particles | | Spacer particles | | |
| Type | Part | Part | Part | Diameter [nm] | Type | Part | Diameter [nm] |
| T-6 | 100 | 0.75 | 1 | 20 | Crosslinked resin particles | 0.5 | 35 |
| T-7 | 100 | 0.75 | 1 | 20 | Crosslinked resin particles | 0.5 | 60 |
| T-8 | 100 | 0.75 | 1 | 20 | Crosslinked resin particles | 0.5 | 80 |
| T-9 | 100 | 0.75 | 1 | 20 | Crosslinked resin particles | 0.5 | 120 |
| T-10 | 100 | 0.75 | 1 | 20 | Crosslinked resin particles | 0.5 | 65(35 + 80) |
| T-11 | 100 | 0.75 | 1 | 20 | Non-crosslinked resin particles | 0.5 | 35 |
| T-12 | 100 | 0.75 | 1 | 20 | Non-crosslinked resin particles | 0.5 | 60 |
| T-13 | 100 | 0.75 | 1 | 20 | Non-crosslinked resin particles | 0.5 | 80 |
| T-14 | 100 | 0.75 | 1 | 20 | Non-crosslinked resin particles | 0.5 | 120 |
| T-15 | 100 | 0.75 | 1 | 20 | Large-diameter silica particles | 0.5 | 40 |
| T-16 | 100 | 0.75 | 1 | 20 | Large-diameter silica particles | 0.5 | 60 |
| T-17 | 100 | 0.75 | 1 | 20 | Large-diameter silica particles | 0.5 | 80 |
| T-18 | 100 | 0.75 | 1 | 20 | Large-diameter silica particles | 0.5 | 100 |
| T-19 | 100 | 0.75 | 1 | 20 | Large-diameter silica particles | 0.5 | 140 |
| T-20 | 100 | 0.75 | 1 | 20 | Composite particles A2 | 0.5 | 50 |
| T-21 | 100 | 0.75 | 1 | 20 | Composite particles B2 | 0.5 | 76 |
| T-22 | 100 | 0.75 | 1 | 20 | Composite particles C2 | 0.5 | 96 |
| T-23 | 100 | 0.75 | 1 | 20 | Composite particles D2 | 0.5 | 120 |
| T-24 | 100 | 0.75 | 1 | 20 | Crosslinked resin particles | 0.5 | 150 |
| T-25 | 100 | 0.75 | 1 | 20 | Non-crosslinked resin particles | 0.5 | 50 |

Carriers (C-3) to (C-25) were prepared according to the same method as that for preparing the carriers (C-1) and (C-2) in all aspects other than that the material and amount of each component were changed as shown below in Tables 11 and 12.

In Tables 11 and 12 below, the carrier cores with a number average primary particle diameter of 20 m were manganese ferrite cores (product of DOWA IP CREATION CO., LTD., volume median diameter: 20 in). The carrier cores with a number average primary particle diameter of 60 m were manganese ferrite cores (product of DOWA IP CREATION CO., LTD., volume median diameter: 60 μm).

In Tables 11 and 12 below, the strontium titanate particles with a number average primary particle diameter of 20 nm or 50 nm were a particle size adjusted product of non-doped strontium titanate particles ("SW-100", product of Titan Kogyo, Ltd.).

In Tables 11 and 12 below, "KR-301" under "Silicone resin" was "KR-301" (solid content: methylphenyl silicone resin, solid concentration: 40% by mass) produced by Shin-Etsu Chemical Co., Ltd. "ES-1001N" under "Silicone resin" was "ES-1001N" (solid content: epoxy resin-modified silicone resin, solid concentration: 45% by mass) produced by Shin-Etsu Chemical Co., Ltd. "MA100" under "Carbon black particles" was "MA100" (number average primary particle diameter: 24.0 nm) produced by Mitsubishi Chemical Corporation.

TABLE 11

| Carrier | | | | | |
|---|---|---|---|---|---|
| | Overall configuration | | | | |
| | Carrier cores | | Coat | Strontium titanate particles | |
| Carrier Type | Part | Diameter [μm] | layers Part | Part | Diameter [nm] |
| C-3 | 100 | 20 | 1.0 | 0.01 | 20 |
| C-4 | 100 | 40 | 2.0 | 0.04 | 30 |
| C-5 | 100 | 60 | 3.0 | 0.1 | 50 |
| C-6 | 100 | 20 | 1.0 | 0.04 | 30 |
| C-7 | 100 | 40 | 2.0 | 0.1 | 50 |
| C-8 | 100 | 60 | 3.0 | 0.01 | 20 |
| C-9 | 100 | 20 | 2.0 | 0.01 | 50 |
| C-10 | 100 | 40 | 3.0 | 0.04 | 20 |
| C-11 | 100 | 60 | 1.0 | 0.1 | 30 |
| C-12 | 100 | 20 | 3.0 | 0.1 | 30 |
| C-13 | 100 | 40 | 1.0 | 0.01 | 50 |
| C-14 | 100 | 60 | 2.0 | 0.04 | 20 |
| C-15 | 100 | 20 | 2.0 | 0.1 | 20 |
| C-16 | 100 | 40 | 3.0 | 0.01 | 30 |
| C-17 | 100 | 60 | 1.0 | 0.04 | 30 |
| C-18 | 100 | 20 | 3.0 | 0.04 | 50 |
| C-19 | 100 | 40 | 1.0 | 0.1 | 20 |
| C-20 | 100 | 60 | 2.0 | 0.01 | 30 |
| C-21 | 100 | 40 | 1.5 | 0.04 | 30 |
| C-22 | 100 | 40 | 1.5 | 0.04 | 30 |
| C-23 | 100 | 40 | 1.5 | 0.04 | 30 |
| C-24 | 100 | 40 | 1.5 | 0.04 | 30 |
| C-25 | 100 | 40 | 1.5 | 0.04 | 30 |

TABLE 12

| Carrier | | | | | | | |
|---|---|---|---|---|---|---|---|
| | Coat layer composition | | | | | | |
| | | | Barium titanate particles | | Carbon black particles | | |
| | Silicone resin | | | Diameter | | | Diameter |
| Type | Type | part | part | [nm] | Type | part | [nm] |
| C-3 | KR-255 | 100 | 5 | 102 | EC300J | 8 | 39.5 |
| C-4 | KR-255 | 100 | 30 | 304 | EC300J | 8 | 39.5 |
| C-5 | KR-255 | 100 | 45 | 495 | EC300J | 8 | 39.5 |
| C-6 | KR-255 | 100 | 45 | 495 | EC300J | 8 | 39.5 |
| C-7 | KR-255 | 100 | 5 | 102 | EC300J | 8 | 39.5 |
| C-8 | KR-255 | 100 | 30 | 304 | EC300J | 8 | 39.5 |
| C-9 | KR-255 | 100 | 30 | 495 | EC300J | 8 | 39.5 |
| C-10 | KR-255 | 100 | 45 | 102 | EC300J | 8 | 39.5 |
| C-11 | KR-255 | 100 | 5 | 304 | EC300J | 8 | 39.5 |
| C-12 | KR-255 | 100 | 30 | 102 | EC300J | 8 | 39.5 |
| C-13 | KR-255 | 100 | 45 | 304 | EC300J | 8 | 39.5 |
| C-14 | KR-255 | 100 | 5 | 495 | EC300J | 8 | 39.5 |
| C-15 | KR-255 | 100 | 45 | 304 | EC300J | 8 | 39.5 |
| C-16 | KR-255 | 100 | 5 | 495 | EC300J | 8 | 39.5 |
| C-17 | KR-255 | 100 | 30 | 102 | EC300J | 8 | 39.5 |
| C-18 | KR-255 | 100 | 5 | 304 | EC300J | 8 | 39.5 |
| C-19 | KR-255 | 100 | 30 | 495 | EC300J | 8 | 39.5 |
| C-20 | KR-255 | 100 | 45 | 102 | EC300J | 8 | 39.5 |
| C-21 | KR-255 | 100 | 20 | 83 | EC300J | 8 | 39.5 |
| C-22 | KR-255 | 100 | 20 | 588 | EC300J | 8 | 39.5 |
| C-23 | KR-301 | 100 | 20 | 304 | EC300J | 8 | 39.5 |
| C-24 | ES-1001N | 100 | 20 | 304 | EC300J | 8 | 39.5 |
| C-25 | KR-255 | 100 | 20 | 304 | MA100 | 8 | 24.0 |

Carriers (C-26) to (C-48) were prepared according to the same method as that for preparing the carriers (C-3) to (C-25) in all aspects other than that the external additive addition was omitted. That is, the carriers (C-26) to (C-48) included the same carrier mother particles as the carrier mother particles of the carriers (C-3) to (C-25), respectively. By contrast, the carriers (C-26) to (C-48) substantially included no strontium titanate particles. Specifically, the carrier (C-3) and the carrier (C-26) included the same carrier mother particles. The carrier (C-4) and the carrier (C-27) included the same carrier mother particles. The same applies to the respective relationships between the carriers (C-5) to (C-25) and the carriers (C-28) to (C-48).

[Developers (A-8) to (A-32)]

Developers (A-8) to (A-32) (toner concentration 8% by mass) each used as an initial developer were prepared according to the same method as that for preparing the developer (A-4) in all aspects other than that the combination of the toner and the carrier was changed as shown below in Table 13.

[Preparation of Developers (B-10) to (B-36)]

Developers (B-10) to (B-36) (toner concentration 90% by mass) each used as a replenishment developer were prepared according to the same method as that for preparing the developer (B-4) in all aspects other than that the combination of the toner and the carrier was changed as shown below in Table 13.

Examples 5 to 28 and Comparative Examples 6 to 9

As shown below in Table 13, any of the initial developers (A-8) to (A-32) and any of the replenishment developers (B-10) to (B-36) were combined to obtain developer sets of Examples 5 to 28 and Comparative Examples 6 to 9. Table 13 below also show the distance L in each developer.

TABLE 13

| | Initial developer | | | | Replenishment developer | | | |
|---|---|---|---|---|---|---|---|---|
| | Type | Toner | Carrier | L [nm] | Type | Tone | Carrier | L [nm] |
| Example 5 | A-8 | T-6 | C-3 | −5 | B-10 | T-6 | C-26 | 15 |
| Example 6 | A-9 | T-7 | C-4 | 10 | B-11 | T-7 | C-27 | 40 |
| Example 7 | A-10 | T-8 | C-5 | 10 | B-12 | T-8 | C-28 | 60 |
| Example 8 | A-11 | T-9 | C-6 | 70 | B-13 | T-9 | C-29 | 100 |
| Example 9 | A-12 | T-10 | C-7 | −5 | B-14 | T-10 | C-30 | 95 |
| Example 10 | A-13 | T-11 | C-8 | −5 | B-15 | T-11 | C-31 | 15 |
| Example 11 | A-14 | T-12 | C-9 | −10 | B-16 | T-12 | C-32 | 40 |
| Example 12 | A-15 | T-13 | C-10 | 40 | B-17 | T-13 | C-33 | 60 |
| Example 13 | A-16 | T-14 | C-11 | 70 | B-18 | T-14 | C-34 | 100 |
| Example 14 | A-17 | T-15 | C-12 | −10 | B-19 | T-15 | C-35 | 20 |
| Example 15 | A-18 | T-16 | C-13 | −10 | B-20 | T-16 | C-36 | 40 |
| Example 16 | A-19 | T-17 | C-14 | 40 | B-21 | T-17 | C-37 | 60 |
| Example 17 | A-20 | T-18 | C-15 | 60 | B-22 | T-18 | C-38 | 80 |
| Example 18 | A-21 | T-19 | C-16 | 90 | B-23 | T-19 | C-39 | 120 |
| Example 19 | A-22 | T-20 | C-17 | 0 | B-24 | T-20 | C-40 | 30 |
| Example 20 | A-23 | T-21 | C-18 | 6 | B-25 | T-21 | C-41 | 56 |
| Example 21 | A-24 | T-22 | C-19 | 56 | B-26 | T-22 | C-42 | 76 |
| Example 22 | A-25 | T-23 | C-20 | 70 | B-27 | T-23 | C-43 | 100 |
| Comparative Example 6 | A-26 | T-24 | C-6 | 100 | B-28 | T-24 | C-29 | 130 |
| Comparative Example 7 | A-27 | T-25 | C-9 | −20 | B-29 | T-25 | C-32 | 30 |
| Comparative Example 8 | A-28 | T-2 | C-21 | 10 | B-30 | T-2 | C-44 | 40 |
| Comparative Example 9 | A-29 | T-2 | C-22 | 10 | B-31 | T-2 | C-45 | 40 |
| Example 23 | A-30 | T-2 | C-23 | 10 | B-32 | T-2 | C-46 | 40 |
| Example 24 | A-31 | T-2 | C-24 | 10 | B-33 | T-2 | C-47 | 40 |
| Example 25 | A-32 | T-2 | C-25 | 10 | B-34 | T-2 | C-48 | 40 |
| Example 26 | A-4 | T-2 | C-2 | 10 | B-35 | T-2 | C-26 | 40 |
| Example 27 | A-10 | T-8 | C-5 | 10 | B-35 | T-2 | C-26 | 40 |
| Example 28 | A-10 | T-8 | C-5 | 10 | B-36 | T-8 | C-1 | 60 |

[Evaluation 2]

With respect to each of the developer sets of Examples 5 to 28 and Comparative Examples 6 to 8, image density and fogging were evaluated in the same manner as for the developer sets of Examples 1 to 4 and Comparative Examples 1 to 5. Evaluation results are shown below in Tables 14.

TABLE 14

| | Developer | | Image density | | | | Fogging | | | |
|---|---|---|---|---|---|---|---|---|---|---|
| | Initial | Replenishment | $ID_{1k}$ | Rating | $ID_{100k}$ | Rating | $FD_{1k}$ | Rating | $FD_{100k}$ | Rating |
| Example 5 | A-8 | B-10 | 1.27 | B | 1.41 | A | 0.000 | A | 0.001 | A |
| Example 6 | A-9 | B-11 | 1.40 | A | 1.42 | A | 0.001 | A | 0.000 | A |
| Example 7 | A-10 | B-12 | 1.41 | A | 1.44 | A | 0.000 | A | 0.003 | B |
| Example 8 | A-11 | B-13 | 1.42 | A | 1.43 | A | 0.003 | B | 0.000 | A |
| Example 9 | A-12 | B-14 | 1.43 | A | 1.43 | A | 0.000 | A | 0.001 | A |
| Example 10 | A-13 | B-15 | 1.28 | B | 1.43 | A | 0.001 | A | 0.003 | B |
| Example 11 | A-14 | B-16 | 1.26 | B | 1.42 | A | 0.000 | A | 0.000 | A |
| Example 12 | A-15 | B-17 | 1.42 | A | 1.42 | A | 0.001 | A | 0.001 | A |
| Example 13 | A-16 | B-18 | 1.41 | A | 1.42 | A | 0.002 | B | 0.004 | B |
| Example 14 | A-17 | B-19 | 1.28 | B | 1.41 | A | 0.001 | A | 0.001 | A |
| Example 15 | A-18 | B-20 | 1.27 | B | 1.42 | A | 0.001 | A | 0.001 | A |
| Example 16 | A-19 | B-21 | 1.44 | A | 1.43 | A | 0.000 | A | 0.005 | B |
| Example 17 | A-20 | B-22 | 1.42 | A | 1.43 | A | 0.001 | A | 0.001 | A |
| Example 18 | A-21 | B-23 | 1.43 | A | 1.42 | A | 0.003 | B | 0.001 | A |
| Example 19 | A-22 | B-24 | 1.42 | A | 1.41 | A | 0.000 | A | 0.004 | B |
| Example 20 | A-23 | B-25 | 1.42 | A | 1.41 | A | 0.001 | A | 0.001 | A |
| Example 21 | A-24 | B-26 | 1.42 | A | 1.42 | A | 0.003 | B | 0.001 | A |
| Example 22 | A-25 | B-27 | 1.41 | A | 1.42 | A | 0.002 | B | 0.004 | B |
| Comparative Example 6 | A-26 | B-28 | 1.27 | B | 1.42 | A | 0.011 | C | 0.001 | A |
| Comparative Example 7 | A-27 | B-29 | 0.97 | C | 1.41 | A | 0.001 | A | 0.001 | A |
| Comparative Example 8 | A-28 | B-30 | 1.43 | A | 0.98 | C | 0.001 | A | 0.012 | C |
| Comparative Example 9 | A-29 | B-31 | 1.43 | A | 1.42 | A | 0.001 | A | 0.008 | C |
| Example 23 | A-30 | B-32 | 1.42 | A | 1.41 | A | 0.001 | A | 0.001 | A |
| Example 24 | A-31 | B-33 | 1.43 | A | 1.41 | A | 0.000 | A | 0.001 | A |
| Example 25 | A-32 | B-34 | 1.43 | A | 1.42 | A | 0.000 | A | 0.001 | A |
| Example 26 | A-4 | B-35 | 1.43 | A | 1.42 | A | 0.001 | A | 0.001 | A |
| Example 27 | A-10 | B-35 | 1.42 | A | 1.41 | A | 0.001 | A | 0.001 | A |
| Example 28 | A-10 | B-36 | 1.43 | A | 1.42 | A | 0.000 | A | 0.001 | A |

As shown in Tables 10 to 14, the developer sets of Examples 5 to 28 each had Features X. As a result, the developer sets of Examples 5 to 28 formed images with desired image density even in the low-temperature and low-humidity environment and formed images with less fogging even in the high-temperature and high-humidity environment.

By contrast, the developer set of Comparative Example 6 contained the spacer particles with a number average primary particle diameter of greater than 150 nm. It is thought that the spacer particles with a number average primary particle diameter of greater than 150 nm inhibit contact between the first toner particles or the second toner particles and the first carrier particles or the second carrier particles. As a result, fogging occurred after the 1000-sheet consecutive printing with the developer set of Comparative Example 6.

In the developer set of Comparative Example 7, the spacer particles of the first toner particles and the second toner particles were the same in diameter as the strontium titanate particles of the first carrier particles. It is thought that when the spacer particles and the strontium titanate particles have the same diameter, the spacer particles exhibit their function insufficiently. As a result, image density of the images formed with the developer set of Comparative Example 7 was insufficient after the 1000-sheet consecutive printing.

The developer set of Comparative Example 8 contained the barium titanate particles with a number average primary particle diameter of less than 100 nm. The barium titanate particles with a number average primary particle diameter of less than 100 nm has a low specific permittivity. As a result, image density was insufficient and fogging occurred after the 100,000-sheet consecutive printing with the developer set of Comparative Example 8.

The developer set of Comparative Example 9 contained the barium titanate particles with a number average primary particle diameter of greater than 500 nm. The barium titanate particles with a number average primary particle diameter of greater than 500 nm easily dissociate from the coat layers. As a result, fogging occurred after the 100,000-sheet consecutive printing with the developer set of Comparative Example 9.

From the results of Examples 5 to 28, it is considered preferable to satisfy the following conditions in addition to having Features X.

Number average primary particle diameter of strontium titanate particles: at least 15 nm and no greater than 85 nm Volume median diameter of carrier cores: at least 15.0 μm and no greater than 65.0 μm Mass ratio of coat layers to carrier cores: at least 0.5% by mass and no greater than 5.0% by mass Content ratio of barium titanate particles: at least 3 parts by mass and no greater than 47 parts by mass to 100 parts by mass of coating resin Content ratio of strontium titanate particles: at least 0.02 parts by mass and no greater than 0.06 parts by mass to 100 parts by mass of carrier mother particles Distance L: at least −15 nm and no greater than 95 nm

What is claimed is:

1. A developer set comprising:

a first developer; and a second developer, wherein the first developer contains a first toner containing first toner particles and a first carrier containing first carrier particles, the second developer contains a second toner containing second toner particles and a second carrier containing second carrier particles, the first toner particles and the second toner particles each include a toner mother particle and external additive particles attached to a surface of the toner mother particle, the external additive particles include spacer particles, the spacer particles have a number average primary particle diameter of at least 55 nm and no greater than 70 nm, the first carrier particles each include a first carrier mother particle and strontium titanate particles attached to a surface of the first carrier mother particle, the number average primary particle diameter of the spacer particles is larger than that of the strontium titanate particles, the second carrier particles each include a second carrier mother particle, the second carrier particles substantially include no strontium titanate particles on surfaces of the second carrier mother particles, the first carrier mother particles and the second carrier mother particles each include a carrier core and a coat layer covering a surface of the carrier core, a mass ratio of the coat layers to the carrier cores is at least 1.2% by mass and no greater than 2.5% by mass, the coat layers contain a coating resin and barium titanate particles, the coating resin includes silicone resin, and the barium titanate particles have a number average primary particle diameter of at least 100 nm and no greater than 500 nm.

2. The developer set according to claim 1, wherein the first toner particles and the second toner particles are identical toner particles.

3. The developer set according to claim 1, wherein the coat layers further contain carbon black particles.

4. The developer set according to claim 1, wherein the strontium titanate particles have a number average primary particle diameter of at least 15 nm and no greater than 85 nm.

5. The developer set according to claim 1, wherein an amount of the spacer particles is at least 0.01 parts by mass and no greater than 4.0 parts by mass relative to 100.0 parts by mass of the toner mother particles.

6. The developer set according to claim 1, wherein the external additive particles further include silica particles, and the silica particles have a number average primary particle diameter of at least 10 nm and no greater than 30 nm.

7. The developer set according to claim 1, wherein the first developer is an initial developer, and the second developer is a replenishment developer.

8. An image forming apparatus comprising:

the developer set according to claim 1; and a development device that develops an electrostatic latent image with the developer set, wherein the first developer is an initial developer, the second developer is a replenishment developer, the development device includes a developer bearing member, a restriction blade, an accommodation section that accommodates the initial developer and a stirring shaft, and a replenishment section that replenishes the accommodation section with the replenishment developer, the restriction blade is located below the developer bearing member, and the developer bearing member is located at a position higher than the stirring shaft.

9. The developer set according to claim 1, wherein the spacer particles are resin particles.

10. The developer set according to claim 1, wherein the spacer particles are composite particles including resin particles and silica particles attached to surfaces of the resin particles.

* * * * *